(12) United States Patent
Reese et al.

(10) Patent No.: US 9,767,353 B2
(45) Date of Patent: Sep. 19, 2017

(54) SYSTEM AND METHOD FOR TRANSCRIBING HISTORICAL RECORDS INTO DIGITIZED TEXT

(71) Applicant: Ancestry.com Operations Inc., Provo, UT (US)

(72) Inventors: Jack Reese, Lindon, UT (US); Michael Murdock, Provo, UT (US); Shawn Reid, Orem, UT (US); Laryn Brown, Highland, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 81 days.

(21) Appl. No.: 14/841,502

(22) Filed: Aug. 31, 2015

(65) Prior Publication Data

US 2016/0063321 A1 Mar. 3, 2016

Related U.S. Application Data

(60) Provisional application No. 62/044,076, filed on Aug. 29, 2014.

(51) Int. Cl.
*G06K 9/00* (2006.01)
*G06K 9/18* (2006.01)
(Continued)

(52) U.S. Cl.
CPC ..... *G06K 9/00463* (2013.01); *G06K 9/00456* (2013.01); *G06K 9/00859* (2013.01);
(Continued)

(58) Field of Classification Search
CPC ............... G06K 9/6201; G06K 9/6215; G06K 9/00463; G06K 9/00859; G06K 9/18; G06K 9/52
(Continued)

(56) References Cited

U.S. PATENT DOCUMENTS

| | | | |
|---|---|---|---|
| 4,488,243 A | 12/1984 | Brown et al. | |
| 4,918,733 A | 4/1990 | Daugherty | |

(Continued)

OTHER PUBLICATIONS

Rath, et al. (Word Spotting for Historical Documents), Springer, pp. 139-152, 2007.*

(Continued)

*Primary Examiner* — Daniel Mariam
(74) *Attorney, Agent, or Firm* — Kilpatrick Townsend & Stockton LLP

(57) ABSTRACT

A handwriting recognition system converts word images on documents, such as document images of historical records, into computer searchable text. Word images (snippets) on the document are located, and have multiple word features identified. For each word image, a word feature vector is created representing multiple word features. Based on the similarity of word features (e.g., the distance between feature vectors), similar words are grouped together in clusters, and a centroid that has features most representative of words in the cluster is selected. A digitized text word is selected for each cluster based on review of a centroid in the cluster, and is assigned to all words in that cluster and is used as computer searchable text for those word images where they appear in documents. An analyst may review clusters to permit refinement of the parameters used for grouping words in clusters, including the adjustment of weights and other factors used for determining the distance between feature vectors.

22 Claims, 14 Drawing Sheets

(51) Int. Cl.
    *G06K 9/52*            (2006.01)
    *G06K 9/62*            (2006.01)

(52) U.S. Cl.
    CPC ................ *G06K 9/18* (2013.01); *G06K 9/52* (2013.01); *G06K 9/6201* (2013.01); *G06K 9/6215* (2013.01); *G06K 9/6218* (2013.01)

(58) Field of Classification Search
    USPC .......................................... 382/186–187, 225
    See application file for complete search history.

(56) References Cited

U.S. PATENT DOCUMENTS

| | | | |
|---|---|---|---|
| 5,442,715 A | 8/1995 | Gaborski et al. | |
| 5,664,058 A | 9/1997 | Vysotsky | |
| 6,249,604 B1 | 6/2001 | Huttenlocher et al. | |
| 6,393,395 B1 | 5/2002 | Guha et al. | |
| 8,077,973 B2 | 12/2011 | Dong | |
| 8,208,726 B2 | 6/2012 | Eshghi et al. | |
| 8,261,200 B2* | 9/2012 | Denoue | G06F 17/30253 382/177 |
| 2012/0084328 A1* | 4/2012 | Ishikawa | G06F 17/30651 707/805 |
| 2016/0063354 A1 | 3/2016 | Reese et al. | |
| 2016/0063355 A1 | 3/2016 | Reese et al. | |

OTHER PUBLICATIONS

U.S. Appl. No. 14/841,519, filed Aug. 31, 2015, Non-Final Office Action mailed Dec. 12, 2016, all pages.

Itakura, F., "Minimum Prediction Residual Principle Applied to Speeach Recognition", IRRR Transactions on Acoustic Speech & Signal Processing, vol. ASSP-23, pp. 67-72, Feb. 1975.

Sakoe, H., et al., "Dynamic Programming Algorithm Optimization for Spoked Word Recognition", IEEE Transactions on Acoustic Speech & Signal Processing, vol. ASSP-26, No. 1, Feb. 1978.

\* cited by examiner

TOP LINE PROFILE

BOTTOM LINE PROFILE

LEFT LINE PROFILE

RIGHT LINE PROFILE

VERTICAL PROJECTION PROFILE

HORIZONTAL PROJECTION PROFILE

LOCAL MAXIMA PEAKS

LOCAL MINIMA VALLEYS

WATERSHED CUP AREA

WATERSHED CAP AREA

LOOPS-HOLES

INTERSECTIONS-CROSSINGS

CONVEX HULL

STROKE ORIENTATION/SLANT

WORD ASPECT RATIO

SYSTEM AND METHOD FOR TRANSCRIBING HISTORICAL RECORDS INTO DIGITIZED TEXT

CROSS REFERENCES TO RELATED APPLICATIONS

This application claims the benefit of and is a non-provisional of U.S. Provisional Application Ser. No. 62/044,076 filed on Aug. 29, 2014, which is expressly incorporated by reference in its entirety for all purposes as if fully set forth herein.

BACKGROUND OF THE INVENTION

Converting images of historical records into computer searchable text can be challenging. Current systems often cannot identify individual words within a digital image of historical records. Because words may be arranged in variable patterns and are often handwritten, accurately identifying and converting individual words may require the efforts of a person having experience in analysis of handwritten historical records. In some cases, the expert may have to review and manually enter text (manually transcribe words) corresponding to all or most of the individual words in the historical record image.

Manually transcribing words in historical records is time-consuming and expensive. Thus, historical records are often stored as digital image documents (rather than as computer searchable text), and researchers needing to search such documents for information are required to view them in order to find information.

There is thus arisen a need in the art for reducing the time and cost for producing searchable text versions of historical records.

BRIEF SUMMARY OF THE INVENTION

There is provided, in accordance with embodiments of the present invention, a network/system and method for creating a document with computer searchable text corresponding to word images in a handwritten document, such as a historical record. In embodiments, digital text is assigned to word images in the record based on the grouping of word images that likely represent the same handwritten word. A digital text word is assigned to word images that have been grouped together.

In one specific embodiment, a method for creating digitized text for a record from an image of the record comprises obtaining one or more digital images of a record, evaluating the digital images in order to locate word images; for each located word image, identifying multiple word features of that word image; assigning, to one group (cluster) of word images, designated ones of the multiple word images based on the distance between the multiple word images, the distance representing the similarity of word features between at least two of the word images; selecting a representative word image (centroid) in the one group of word images; selecting a digitized text for the representative word image; and assigning the selected digitized text to each of the word images in the one group of word images.

A more complete understanding of the present invention may be derived by referring to the detailed description of the invention and to the claims, when considered in connection with the Figures.

DETAILED DESCRIPTION OF THE INVENTION

There are various embodiments and configurations for implementing the present invention. Generally, embodiments provide systems and methods for converting digital images of handwritten documents into computer searchable text.

In described embodiments, features of individual word images appearing on records, such as a historical record created in handwritten form and stored as a digital image, are identified. The word images are then assigned to a group or cluster of word images based on common word features, with the word images in each cluster having a minimum or threshold number of similar common word features. A selected digital text word (e.g., as entered by a human handwriting analyst) is assigned to each cluster, and the same digital text word is associated with the other word images in that cluster (and the record/document in which the word image appears), for purposes of making the record searchable for text.

In one embodiment, the word images in a cluster are assigned a single digital text word by selecting a representative word image in a cluster. The representative word may be a "centroid," i.e., a word whose word features are most representative of the word features of all words in the cluster. For example, the mean or average for each word feature of all words in a cluster may be computed, and the centroid may be the single word image in the cluster whose word feature values are closest to the mean or average value of word features in the cluster. In some embodiments, certain word features may be preferred or weighted more heavily than others for purposes of selecting the centroid.

Figure 1:
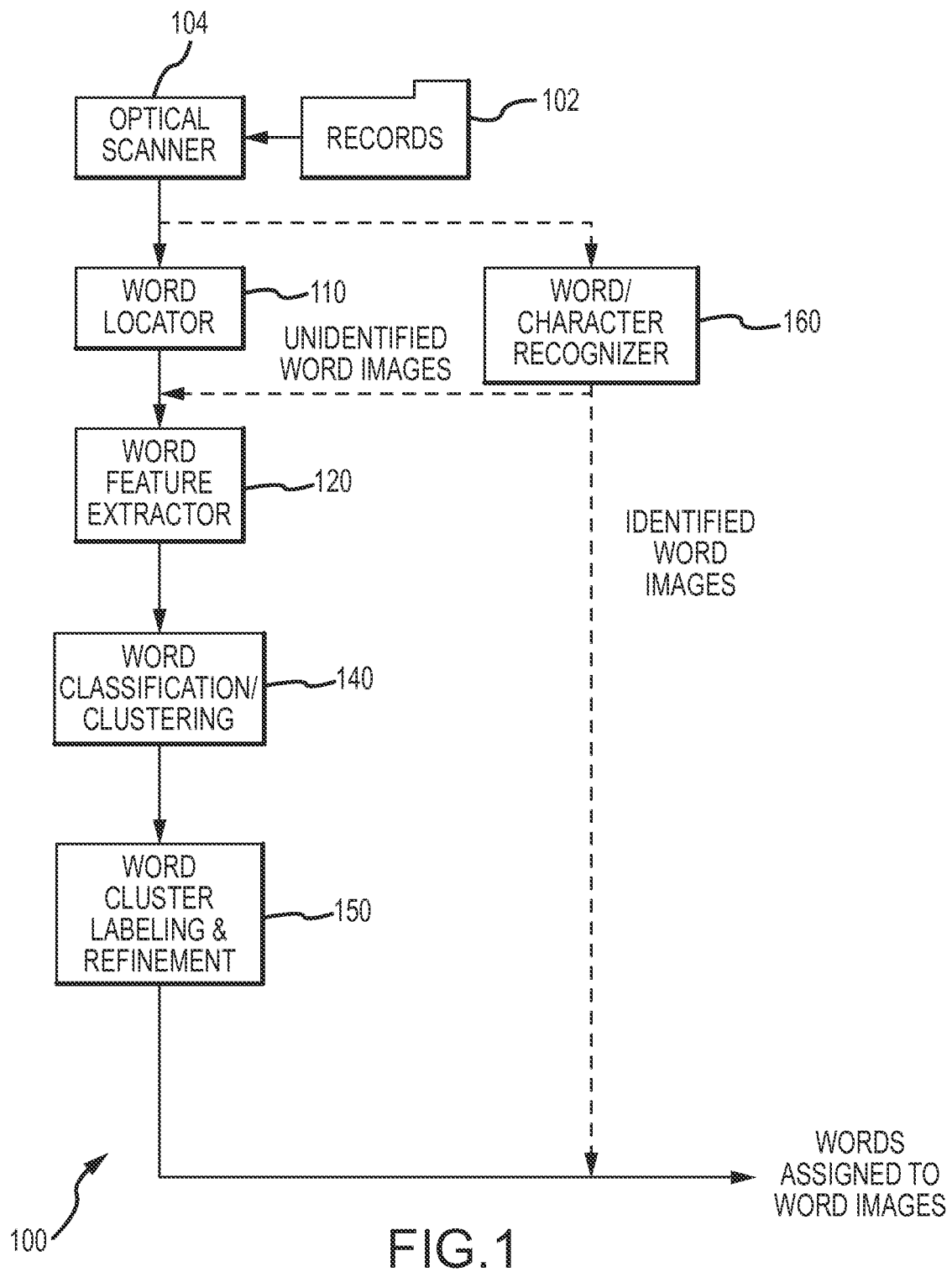
FIG. 1 is a general block diagram illustrating the general components of a handwriting recognition system according to one embodiment.

Referring now to FIG. 1, the general components of a handwriting recognition system 100 according to one embodiment of the invention are illustrated. The system 100 receives record/document images, i.e., digital files representing images of historical records. As an example only, historical records and other documents 102 may be scanned at an optical scanner 104 that provides digital images to the system 100. At its output, the system 100 assigns a digital text word to each (or most) of the individual word images on the received document images. For example, for each document image, the output of the system 100 provides data representing each recognized handwritten word appearing on the document image (and, if appropriate, its location in the document), that can be stored and subsequently searched (as computer searchable text) for a person searching historical records for certain information, such as genealogical information.

The functions of various components and subsystems of the system 100 will be described in greater detail later. Overall, and as illustrated in FIG. 1, the system 100 includes a word locator module/system 110 for locating individual word images (sometimes referred to herein as word "snippets") on each document image. The individual word images are then provided to a word feature extractor module/system 120 that identifies individual features of each word image. The word feature extractor module 120 provides at its output a feature vector for each word image, with each feature vector having values that reflect the characteristics of various word features identified at the word feature extractor module 120. The word feature vectors corresponding to word images are provided to a word classification/clustering system 140 which assigns each individual word image to a word group or cluster having an assigned cluster ID. Each word group or cluster is provided to a word cluster labeling and refinement module/system 150 which assigns a digital text word to that cluster, based on review by a person, such as an expert in handwriting analysis. The output of the word cluster labeling and refinement system represents the digitized text assigned to each word image on each document image, as mentioned earlier.

It should be noted that the present invention is primarily intended to be used with historical records that have handwritten information, especially in circumstances where the records may have degraded over time. However, in broader aspects of the invention, features of the invention may find use with more modern documents, including documents where information appears in printed form. This is illustrated by dashed lines in FIG. 1, where certain scanned documents (such as printed-character documents), may be provided to a word/character recognition system 160, using well-known optical character recognition. In cases where optical character recognition is able to identify words in the documents, the identified word images may be provided at the output of the word recognizer module 160. In cases where some or all of the words in such documents are not identified, those documents or portions thereof maybe provided to the system 100 so that unidentified word images may be analyzed at the word feature extractor module 120, clustered at the word classification/clustering system 140, and then have text words assigned to those word images at the word cluster labeling module 150. Thus, this last mentioned functionality of the system 100 may be used as an enhancement or substitution for optical character recognition systems in circumstances where the condition of a document may not lend itself to accurate word or character recognition and identification.

Figure 2:
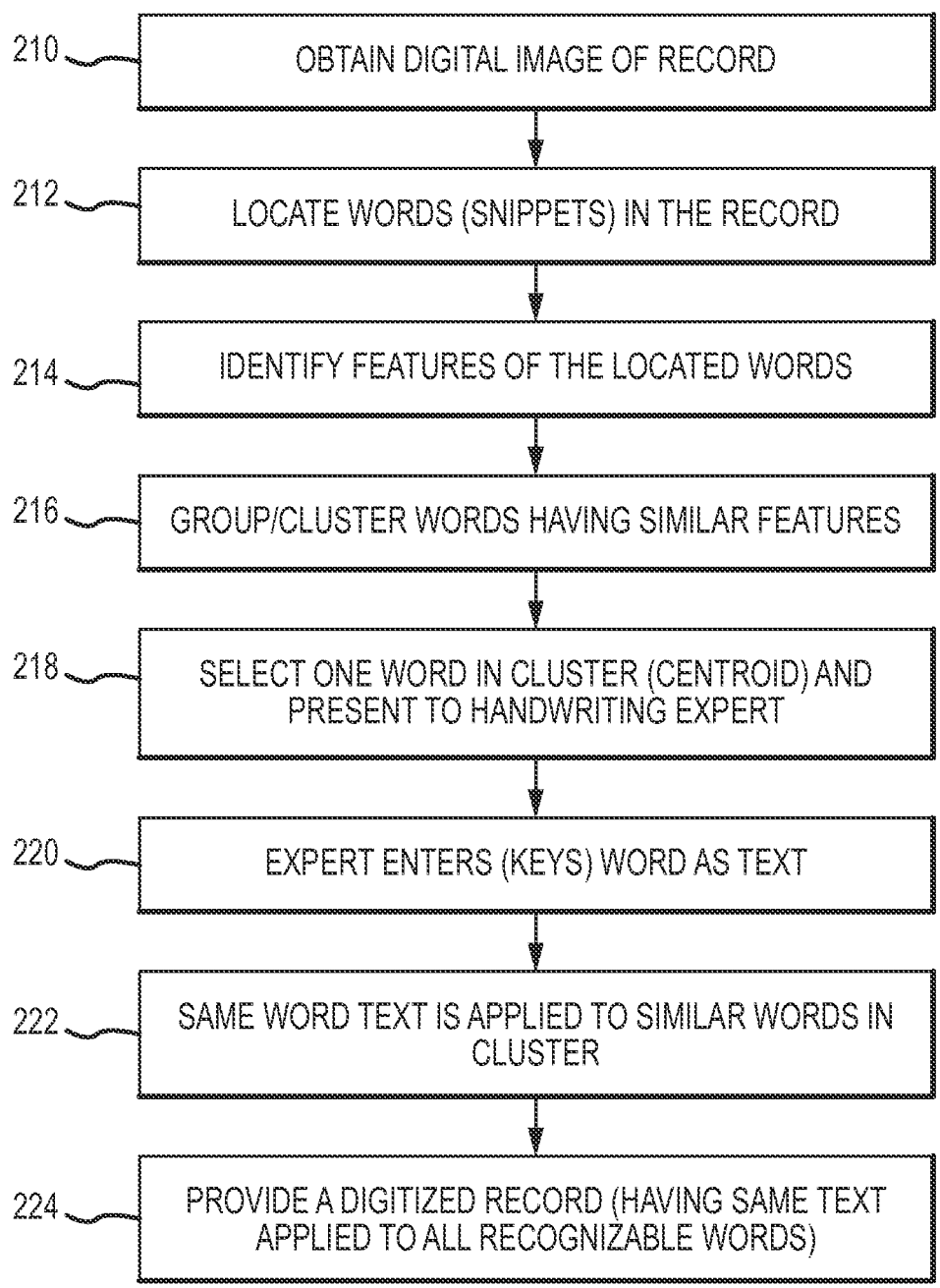
FIG. 2 is a flow diagram illustrating the overall operation of the handwriting recognition system seen in FIG. 1.

The overall operation of the system 100 will now be described in greater detail with reference FIG. 2. At step 210 a digital image of a record is obtained. The record may represent any one of many assembled historical records containing genealogical information, such as birth records, census records, death records, marriage licenses, and other sources of information pertaining to people. Printed or tangible records may be scanned by an optical scanner in order to obtain digital images, as mentioned earlier. Alternatively, the image may be provided from a source that has previously created images of historical records, such as a governmental or other entity that has previously scanned records for use by researchers.

At step 212 the digital image is analyzed at word locator module 110 to locate words (snippets) in the record. Various systems are currently available for locating word images in a document, such as document layout analysis functions used in word recognition systems available from Kofax Limited, Irvine Calif., a subsidiary of Lexmark International, Inc., and from Abbyy USA, Milipits, Calif. Systems for locating word images are also described in U.S. Pat. No. 6,249,604, entitled "METHOD FOR DETERMINING BOUNDARIES OF WORDS IN TEXT," issued on Jun. 19, 2001 to Huttenlocher et al., U.S. Pat. No. 6,393,395, entitled "Handwriting And Speech Recognizer Using Neural Network With Separate Start And Continuation Output Scores," issued on May 21, 2002 to Guha et al., and U.S. Pat. No. 5,442,715, entitled "METHOD AND APPARATUS FOR CURSIVE SCRIPT RECOGNITION," issued on Aug. 15, 1995 to Gaborski et al, each of which is hereby incorporated by reference.

In an alternative embodiment, a method known as "gridlining" may be used to locate words. Gridlining may include, among other things, page layout analysis, table detection, field detection, and blank cell detection, and is described in U.S. application Ser. No. 13/601,111, entitled Automated Field Position Linking of Indexed Data To Digital Images, filed Aug. 31, 2012, by Jack Reese et al., which is also hereby incorporated by reference. In yet another alternative embodiment, document layout analysis for locating word images could also be accomplished manually by a person viewing document images on a computer screen and selecting/marking individual words on the document (e.g., by placing a graphical box or rectangle around each located word), and providing marked individual word images to the word feature extractor module 120.

At step 214, features of the located words are extracted and identified by the word feature extractor module 120. In one embodiment, word features extracted by the word feature extractor module 120 may include Top Line Profile, Bottom Line Profile, Left Line Profile, Right Line Profile, Vertical Projection Profile, Horizontal Projection Profile, Local Maxima/Peaks, Local Minima/Valleys, Watershed Cup Areas, Watershed Cap Areas, Loops-Holes, Intersections-Crossings, Convex Hull, Stroke Orientation/Slant, and Word Aspect Ratio. These features and the manner of detecting and characterizing them in the form of a feature vector, will be described in greater detail below.

At step 216, words having similar word features are grouped or clustered together at the word classification/clustering module 140. Briefly, and as mentioned earlier, each word image and its individual features are characterized in the form of a feature vector which has values representing various features of the handwritten word in the image. Word images that have similar features are grouped together in a cluster. Algorithms will assign words to clusters, based on the similarity of feature vectors. The algorithms used will also cluster words even though there may be variations in handwriting due to multiple authors/enumerators that have created the original historical record. Word images in the same cluster have the same Cluster ID, also to be described in greater detail later. As will also be described later, to minimize the "training" of algorithms which might otherwise require multiple iterations of development and feedback, a handwriting analyst/expert or other human operator may subsequently examine a representative sample of words in each cluster to determine if the clustered words are in fact the same word, and change the weighting of features used to create each feature vector or make other changes to clustering algorithms to improve clustering accuracy.

At step 218, one word in each cluster is selected as a "centroid" by the word classification system 140, with the centroid having the most representative features of words (e.g., having features closest to the overall mean or average of word features) in that cluster (other words in the cluster, while similar, may have fewer common features as one moves away from the position of the centroid). The centroid in each cluster is presented to a handwriting expert. At step 220, the handwriting expert enters or keys the word (corresponding to the centroid) as text at the word cluster labeling and refinement system 150, and at step 222 that same word text is applied or assigned by the system 150 to all the words in that cluster.

At step 224, after clustered words have text associated with them, a digitized record with searchable computer-readable text is provided. The digitized record has each of its word images converted to digital text based on the cluster to which each word image has been assigned (from the foregoing process). The digitized record may be used thereafter for searching the historical records (as computer searchable text).

Figure 3A:
FIGS. 3A-O illustrate word features identified and analyzed by the handwriting recognition system seen in FIG. 1.
Figure 3B:
Figure 3C:
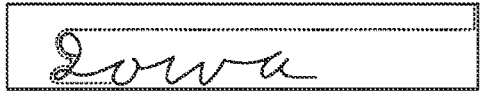
Figure 3D:
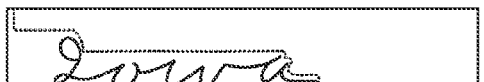
Figure 3E:
Figure 3F:
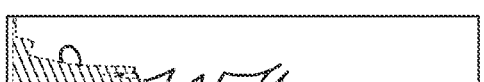
Figure 3G:
Figure 3H:
Figure 3I:
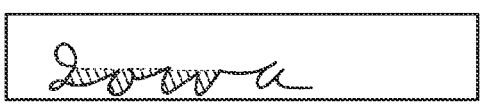
Figure 3J:
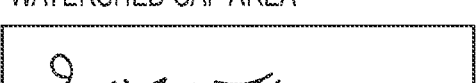
Figure 3K:
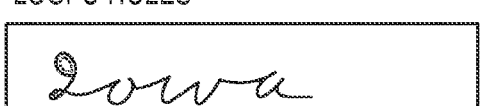
Figure 3L:
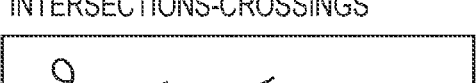
Figure 3M:
Figure 3N:
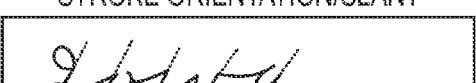
Figure 3O:
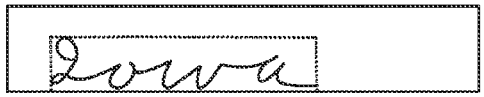

FIGS. 3A-3O illustrate an embodiment in which fifteen different word features are used by the word feature extractor system 120. For purposes of describing the word features and FIGS. 3A-3O, it is assumed that the documents on which word images appear have been provided as or converted into a binary image (binarized) to have only black and white colors or pixels, with black representing the foreground or "ink" (e.g., handwriting), and white representing the background (e.g., the original sheet of paper) on which the handwriting was placed. Well known algorithms such as Otsu binarization which maximize between group variance while minimizing within group variance are effective at binarizing images, and in this case, image snippets. In some cases, well known binning can be used to reduce the number of pixels that need to be analyzed. Further, each word image or snippet is cropped, so that word "signals" around the word that are weak may be removed and thereby leave a pre-established, clean, white space margin around the word.

Top Line Profile

A word profile may be thought of as similar to the familiar face profile which shows the outline of a face—from a profile view showing the neck, chin, mouth, nose, forehead, etc. The face profile is a condensed representation which depicts some notable characteristics of the face. Similarly, a word profile depicts some notable profile attributes of the word. A top line profile represents the outline of the top-most ink pixels that make up the word, as illustrated in FIG. 3A. In other words, the word image is segmented into a plurality of vertical lines or columns (e.g., from left to right), with each column starting from the top margin, and with the lowest point in each column defined by the top-most pixel of the snippet in that column. When aggregated, the signals or data outline represent the top-most pixels of the word (as represented in FIG. 3A by dotted lines).

Bottom Line Profile

A bottom line profile, as illustrated in FIG. 3B, is similar to the top line profile, but rather than an outline of top-most ink pixels, the bottom line profile (represented by dotted lines in FIG. 3B) represents an outline of bottom-most pixels that make up the word.

Left Line Profile

A left line profile, as illustrated in FIG. 3C, is similar to the top line and bottom line profile, but rather than an outline of the top-most pixels or button-most pixels, a left line profile (represented by dotted lines in FIG. 3C) represents an outline of the left-most ink pixels that make up the word.

Right Line Profile

A right line profile, as illustrated in FIG. 3D, is similar to a left line profile, but rather than using left-most ink pixels, the right line profile (dotted lines in FIG. 3D) represents an outline of the right-most pixels that make up the word.

Vertical Projection Profile

Projection profiles are similar to the top, bottom, left and right profiles, but are calculated by projecting lines through the word snippet space, and summing the number of ink pixels along the lines—essentially producing a histogram of the count of ink pixels along the projected lines through the words. Thus, a vertical projection profile, as illustrated in FIG. 3E, represents a histogram of ink pixels in the word along vertically projected lines through each column of the word snippet. The resulting data/waveform signal illustrated in FIG. 3E represents a vertical projection as generated by projecting lines from the top margin of the snippet space.

Horizontal Projection Profile

A horizontal projection profile, as illustrated in FIG. 3F, is similar to the vertical projection profile, but represents a histogram of ink pixels in the word along horizontally projected lines through each row of the word snippet. The resulting data/waveform signal illustrated in FIG. 3F represents a horizontal projection as generated by projecting lines from the right margin in the snippet space.

Local Maxima/Peaks

Local maxima/peaks represent the position and magnitude of the local maxima (peaks) along the profiles described above. Peak features are calculated for each of profiles described above (top, bottom, left and right profiles, and horizontal and vertical projection profiles). An example of local maxima/peaks calculated for a top profile is illustrated FIG. 3G. The identified peaks in FIG. 3G are designated by dotted circles.

Local Minima/Valleys

Local minima/valleys represent the position and magnitude of the local minima (valleys) along the profiles described above. Valley features are calculated for each of the profiles described above (top, bottom, left and right profiles, and horizontal and vertical projection profiles). An example of a minima/valleys calculated for a bottom line profile is illustrated in FIG. 3H. The identified valleys in FIG. 3H are designated by dotted circles.

Watershed Cup Areas

Watershed cup features (as well as watershed cap features, to be described shortly) are a corollary to the peaks and valleys described above and provide additional insight into word feature attributes. Watershed cups are formed between adjacent pairs of peaks along the profiles. A watershed cup represents the watershed area between pairs of adjacent peaks. Each Watershed cup feature is represented in two parameters—the area of the cup and the median/center point within the cup. Watershed cups are associated with the areas above the profile between the neighboring local maxima/peak pairs. An example of a word and its watershed cups areas are illustrated in FIG. 3I, with the watershed cup areas shown with cross hatching.

Watershed Cap Areas

A watershed cap represents the established area between pairs of adjacent valleys. A Watershed cap feature is represented in two parameters—the area of the cap and the median/center point within the cap. Watershed caps are associated with the areas below the profile between the neighboring local minima/valley pairs. An example of a word and its watershed cap areas are illustrated in FIG. 3J, with the watershed cap areas shown with cross hatching.

Loops-Holes

Loops or holes in the word snippet correspond to loops or holes detected in the binarized representation of the word snippet ink pixels. Loops (holes), therefore, are "background" (white) pixels entirely contained within, or surrounded by "ink" (black) pixels. Loop or hole features are represented as a list of parameter pairs including the area (e.g., number of pixels), and the (x,y) coordinate position of the loop/hole center point. An example of a word and its loops/holes are illustrated in FIG. 3K, with the loops-holes designated by dotted lines.

Intersections-Crossings

Intersections or crossings (e.g., a crossed "t", or a number "8," where the ink-stroke crosses over itself), are detected by well-known image processing functions (e.g., morphological operators and filters) designed to detect pixel patterns representing such crossings. These crossings are represented as a list of (x,y) coordinates of the crossings. An example of a word and its intersections/crossings are illustrated in FIG. 3L, with the intersections/crossings designated by dotted lines.

Convex Hull

The Convex Hull is the polygonal convex hull that bounds the word snippet ink pixels, captured as the (x, y) point pairs that describe the bounding convex hull, and is illustrated for an exemplary word in FIG. 3M. The bounding convex whole is designated by dotted lines in FIG. 3M.

Stroke Orientation/Slant

The predominant stroke orientation or slant of the characters in the word snippet is detected based on gradient orientation of the longest/largest stroke components of the word snippet ink pixels. The orientation (slant) feature is represented in a single parameter for the entire word snippet as the angle of orientation in degrees (e.g., average value of longest stroke components). Because stroke slant various widely from person to person, this feature may be weighted less than many other features. The stroke orientation/slants (for which an average is computed) for an exemplary word are illustrated by dotted lines in FIG. 3N.

Word Aspect Ratio

The word aspect ratio is simply the x-y aspect ratio of the width-height of the bounding rectangle that encloses the word snippet ink pixels. The word aspect ratio for an exemplary word is illustrated in FIG. 3O, with the bounding rectangle designated by dotted lines.

The following is Table I illustrates the values that are captured by the word feature extractor module 124 each of the features illustrated in FIGS. 3A-3O. As should be appreciated, for some word features the resulting data can take the form of a single array or set of elements values, whereas the more complex features may take the form of multiple different types of elements and corresponding values for each. As will be described later, the more complex features may be simplified by using a Euclidean distance or calculation to create a single per feature value, which is then used in DTW algorithms for determining distance (similarities) between word images and thereby identify word images that likely represent the same word.

TABLE I

| Feature | Nature of Values |
| --- | --- |
| Top Line Profile | For each top line profile pixel x (horizontal) position, a single value representing the corresponding y location (vertical height) on the top line profile. |
| Bottom Line Profile | For each bottom line profile pixel x position, a single value representing the corresponding y location (vertical height) on the bottom line profile position. |
| Left Line Profile | For each left line profile pixel position, a single value representing the corresponding x location (horizontal location) on the left line profile position. |
| Right Line Profile | For each right line profile pixel position, a single value representing the corresponding X location (horizontal location) on the right line profile position. |
| Vertical Projection Profile | For each vertical projection line (column) in the vertical projection profile, a single value representing the magnitude of the vertical profile at that line. |
| Horizontal Projection Profile | For each horizontal projection line (row) in the horizontal projection profile, a single value representing the magnitude of the horizontal profile at that line. |
| Local Maxima/Peaks | For each of the local maxima/peaks in the word, the x-y coordinates of that peak. |
| Local Minima/Valleys | For each of the local minima or valleys in the word, x-y coordinates of that valley. |
| Watershed Cup Area | For each watershed cup area in the word, the x-y coordinates of the median/center point of the cup and the area or number of pixels within the cup. |
| Watershed Cap Area | For each watershed cap area in the word, the x-y coordinates of the median/center point of the cap, and the area or number of pixels within the cap. |
| Loops-Holes | For each loop or hole, the x-y coordinates of the median/center point of the loop or hole, and the area or number of pixels within the loop or hole |
| Intersections-Crossings | For each intersection, the x-y coordinates of that intersection. |
| Convex Hull | The x-y coordinates of each of the set of points that define the convex hull, starting at the upper left and proceeding in clockwise order around the convex hull. |
| Stroke Orientation/Slant | The average orientation in degrees or radians of the dominant strokes detected across the word. |
| Word Aspect Ratio | For a cropped word (e.g., around which a bounding rectangle or box is located), the horizontal length or width (number of pixels) divided by the vertical height (number of pixels) |

Figure 4:
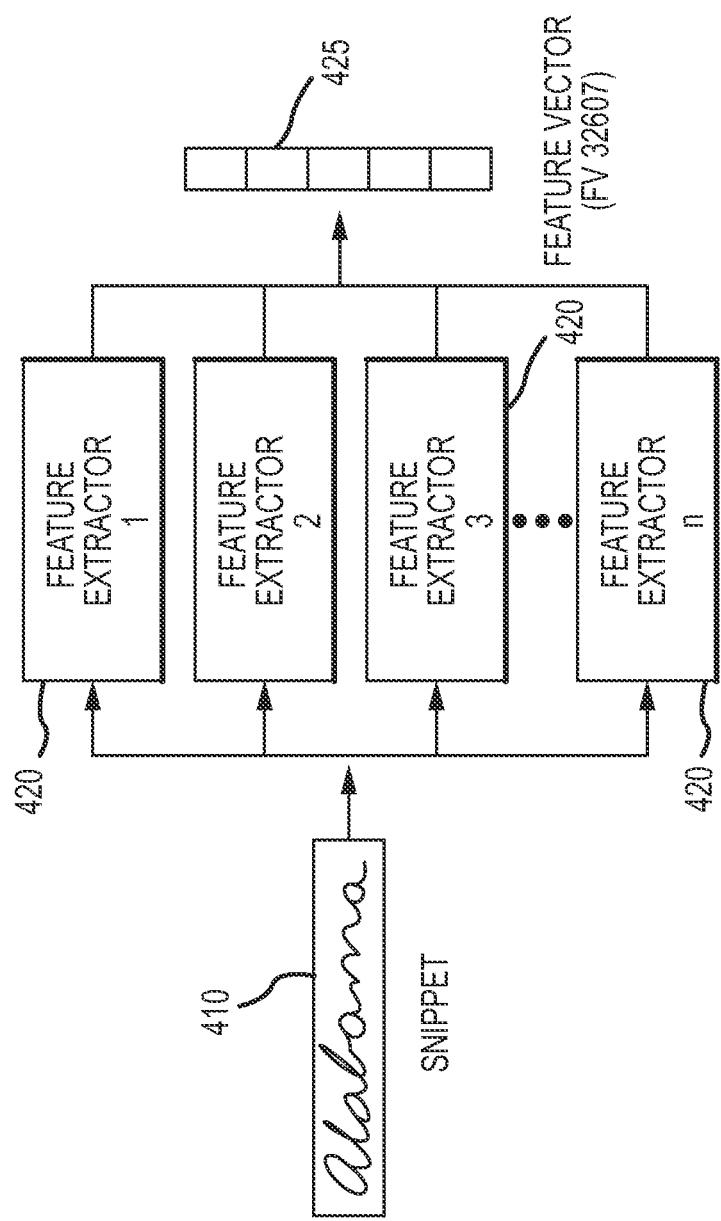
FIG. 4 is a block diagram illustrating the functional components of the word feature extractor system seen in FIG. 1

Turning to FIG. 4, there is illustrated the overall operation of the feature extractor module/subsystem 120 (FIG. 1). As seen, a selected individual digital word image or snippet 410 is provided to the subsystem 120, with the selected word 410 separately provided to each of a plurality of feature extractors 420 that each analyze the provided snippet for a specific feature based on locations of the defining pixels in the snippet (as described above in connection with FIGS. 3A-3O and Table I). Thus, the feature extractors 420 are individually designated Feature Extractor 1 through Feature Extractor n, where n represents the total number of features to be extracted for each word (e.g., fifteen features in the described embodiment, as illustrated in FIGS. 3A-3O). For example, Feature Extractor 1 could represent the digital analysis of the binarized word image for its top line profile and identifying, for each top line profile pixel x (horizontal) position, a single value representing the corresponding y location (vertical height) on the top line profile of the snippet. Feature Extractor 2 could represent the digital analysis of the binarized word image, providing values representing for each bottom line profile pixel x position, a single value representing the corresponding y location (vertical height) on the bottom line profile position, and so forth for each of the other fifteen features in the described embodiment. The values representing the 15 features are then assembled into a single multi-element feature vector 425. Each feature vector is assigned a feature vector ID (that can be used to identify both the feature vector and its corresponding snippet/word image). In the example seen in FIG. 4, for the individual identified snippet ("Alabama"), the feature vector is assigned a feature vector ID "FV 32607." This particular identified feature vector can be stored, retrieved and processed to develop word clusters (each snippet in the cluster representing a handwritten form of the same word). While not illustrated in FIG. 4, other characteristics of the snippet can also be included in the feature vector, such as an identifier for the document image from which the snippet was obtained, as well as the location of the snippet on that document image. In some cases, a feature vector may include a weight for each feature that can be used in calculating distance or similarity between snippets (some features are counted or more heavily weighted than others), also to be described later.

As mentioned, and as will be more fully described later, each feature vector 425 is represented at a high level (such as in FIG. 4) as a linear array of elements, one element corresponding to each feature. However, each element of the feature vector may in itself comprise an array of data elements. In some cases, the feature is represented by a single parameter, such as in the case of stroke orientation/slant (i.e., the average angle of the slant) and word aspect ratio (the value of the width/height ratio). In other cases the feature may be represented by a simple string or array of multi-parameter values, such as the profile features that consists, for each in a string of corresponding locations (along a single axis or direction), a value for each location. In other cases, the array of data elements for each feature may be multi-dimensional and more complex. For example, the peaks, valleys, cups, caps, loops-holes, intersections-crossings and convex hull features may consist of an array of elements, with each element in that array having multiple values (e.g., x-coordinate, y-coordinate and area value). As will also be more fully described later, well known dynamic time warping (DTW) may be used in some embodiments to determine the distance (sometimes referred to as the "cost") between word features and words in order to identify snippets representing the same handwritten word, but in other embodiments, for more complex features involving multidimensional arrays, the feature values may be simplified prior to determining distance between snippets, using a Euclidean technique.

Figure 5:
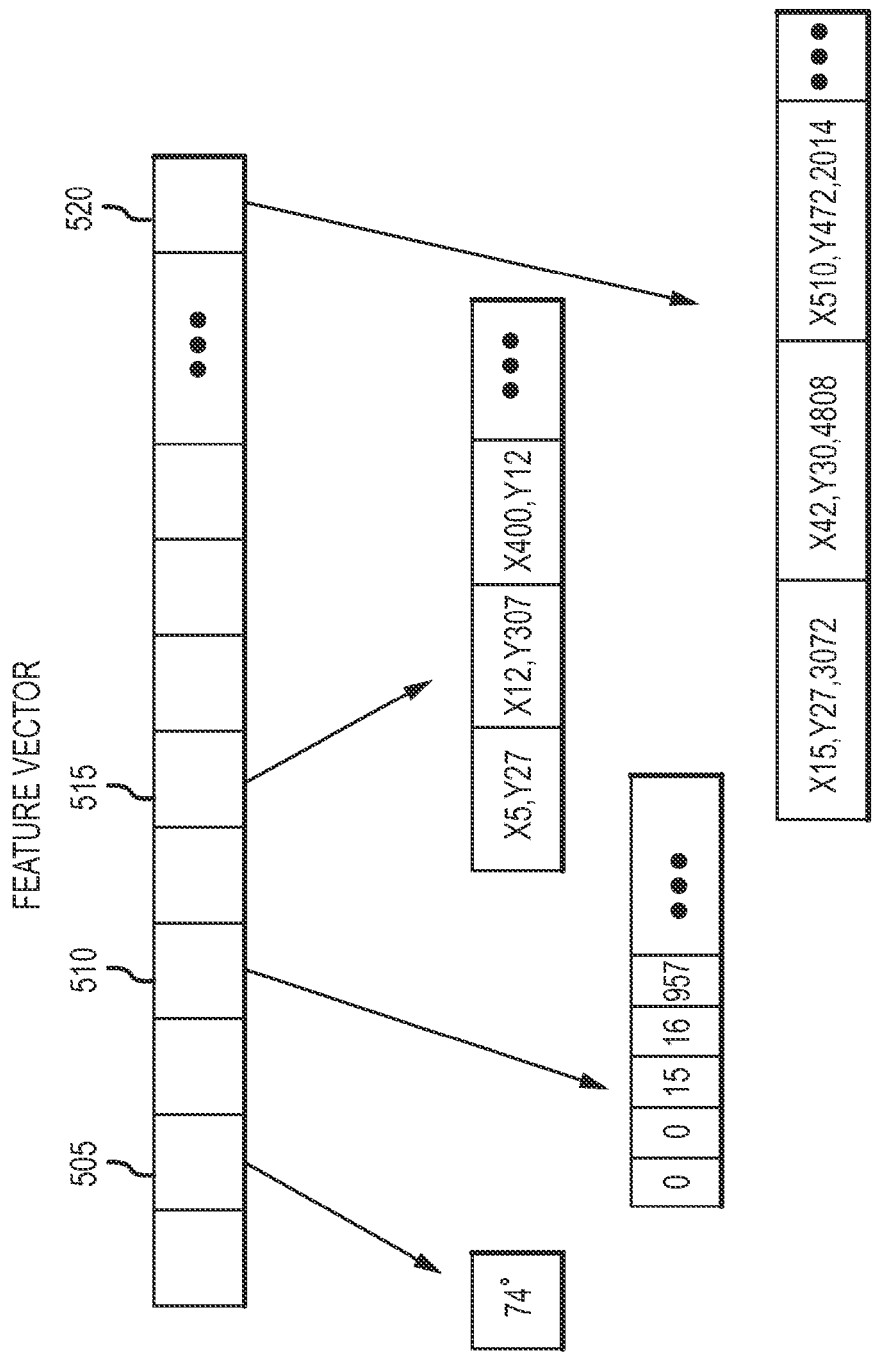
FIG. 5 is a simplified representation of a feature vector for a word image (snippet).

Various elements of an exemplary feature vector are illustrated in FIG. 5. As seen, some elements, such as element 505 representing the stroke orientation feature, have a single parameter value ("74°"). Some elements, such as element 510 representing a top line profile feature, have a string of single values ("0, 0, 15, 16 ... 957"), representing the vertical value at each pre-established horizontal line/location. Still other elements are more complex and multi-dimensional, such as element 515 representing peaks and having two values (x-y coordinates) for all peaks in a word ("x5, y27; x12, y307; x400, y12; etc.") and element 520, representing loops-holes and having triple values (x-y coordinates and area) for loops in a word ("x15, y27, a3072; x42, y30, a4808; x510, y472, a2014; etc.").

Figure 6:
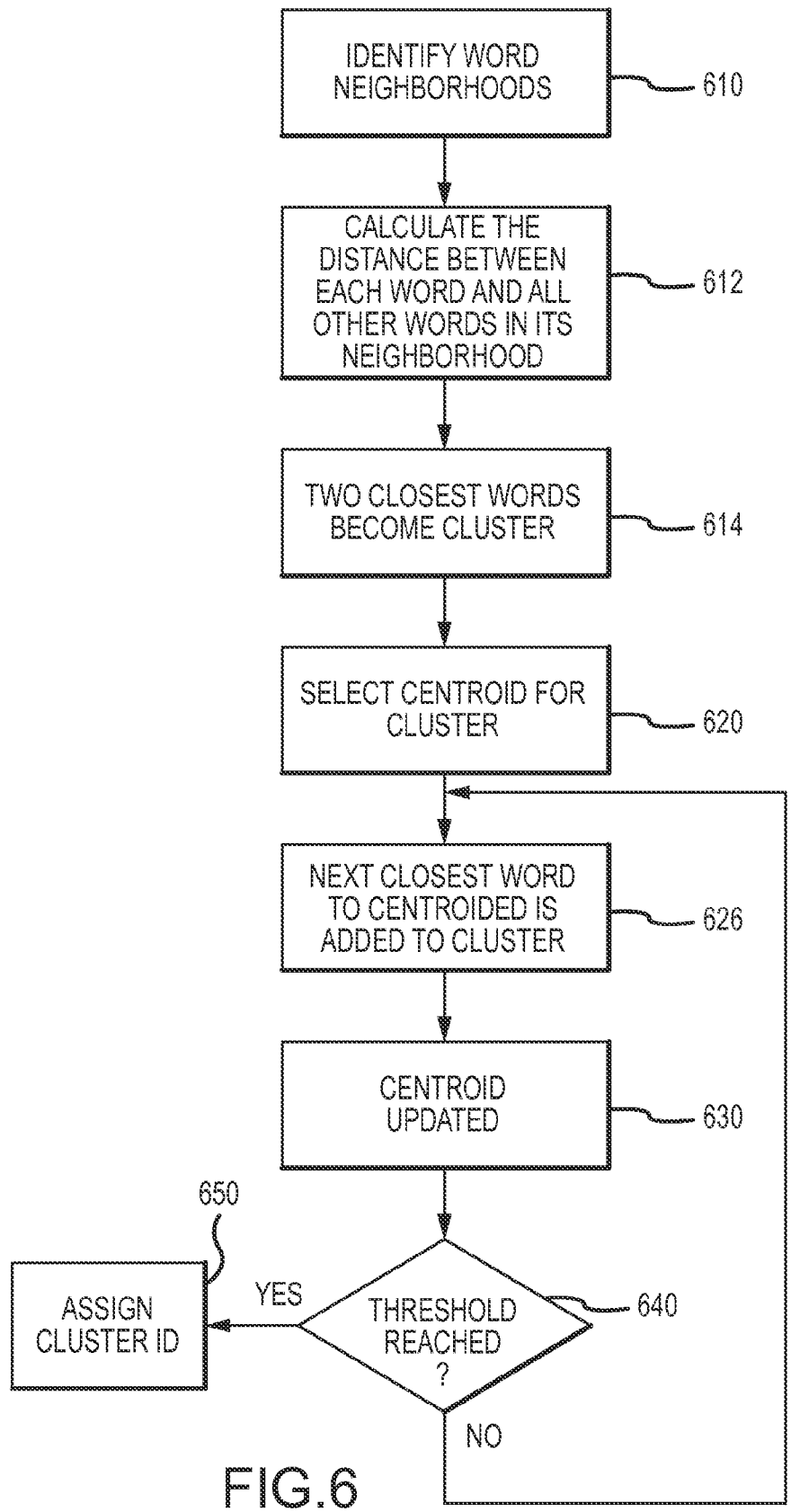
FIG. 6 is a flow diagram illustrating a process for creating word clusters.

Turning now to FIG. 6, there is illustrated a process for creating word clusters and a centroid for each of those clusters, such process generally performed within the word classification/clustering system 140 seen in FIG. 1. The process, at its most basic level, involves the calculation of distance (sometimes referred to as "cost") between "word pairs," i.e., between each word or snippet in a typically large collection of words and every other word or snippet in that large collection of words. The collection of words may each be presented to the word classification/clustering system in the form of the feature vector (from word feature extractor system 120) corresponding to each of the two words, where the feature vector (as noted earlier) may include not only the multiple features that have been extracted from the word (by word feature extractor 120) but also the location of the word (all as uniquely identified by the feature vector ID).

As seen in FIG. 6, the process may include identifying word neighborhoods, step 610, in order to more efficiently manage the number of words that are being compared or analyzed together to calculate a distance. In other words, since the number of words being analyzed is typically very large, the word classification/clustering system 140 may first attempt to group together words that may be roughly related or similar ("neighbors"), so that words that are highly unlikely to ever be clustered together (because they would never be viewed as being represented by the same text word) are not analyzed as word pairs. Step 610 may be accomplished in a number of different possible ways, such as by looking at word features at a very high level and creating neighborhoods of words, where words appearing to begin with the same letter, words having roughly the same length, words captured from similar types of documents and/or words having other very high level similarities may be put into the same "neighborhood." It should be appreciated, of course, that this is merely a step for making the clustering process more efficient, and that if sufficient processing capability is present, all the words provided by the word feature extractor 120 could be considered in a single neighborhood and all those words would be considered together for purposes of finding distances between word pairs.

At step 612, the distance between each word and every other word in its neighborhood is calculated, based on the analysis/comparison of the feature vectors of those two words. The result of this step is a value representing the overall distance between those words, and this value and the manner of obtaining it will be described in greater detail below in conjunction with FIGS. 7 and 8. After a distance is calculated between every word pair at step 612, the word classification/clustering system 140 identifies, for each word, a second word in the neighborhood that it is closest to, and those two words are deemed (at least initially) to be a cluster (step 614). It is possible, at this step, that for each word being considered, two other words may be closest and of the same distance, in which case the cluster may be viewed as having three words, but such circumstance would likely be rare, particularly if there are a large number of features that are being considered for each word. At step 620, one of the words in the initial cluster is selected as the centroid. In one embodiment, the centroid may be the word in the pair that is closest to the mean or average of feature values for the two words in the pair, Since that word is most recent representative of the cluster. However, depending on the preferences of the user of the system, in alternative embodiments a centroid could be selected at this point by creating a phantom word or snippet that has exactly the mean or average feature values and using such a phantom centroid throughout the process of FIG. 6 until the creation of the cluster has been completed.

Next, at step 626, the next closest word (by distance) to the centroid is added to the cluster. Since the cluster now includes an additional word, the mean or average of feature values will most likely have changed, and the centroid is updated, i.e., the word in the expanded cluster that is now closest to the mean or average of feature values is selected as the centroid (of course, in some cases, the updated centroid may be the same centroid that was selected at step 620). The foregoing steps are repeated in order to continue to build the cluster (at step 626) and update the centroid (step 630) until the desired size of the cluster has been reached at step 640. There may be various ways of determining when to stop the building of a cluster. For example, the system might be designed to have clusters with no more than a certain maximum number of words, and when that maximum is reached at step 640, the clustering ceases for that cluster. Alternatively, since the process of FIG. 6 is being performed across a large collection of words, with multiple clusters being simultaneously built, when the largest or smallest of those clusters reaches a specified maximum size, the clustering process may be stopped. Words at that point that have not been placed in a cluster may be set aside and used later with a different collection of words to see if they can be clustered later with other word images. Alternatively, in some circumstances, the un-clustered words might be viewed as so unique that they will be assigned a text word separate and apart from any clustering process (such as by an handwriting expert individually looking at those word images).

As will be described in greater detail later in conjunction with FIG. 11, in some embodiments a cluster may be constructed with multiple regions, such as three regions reflecting an innermost region or ring of snippets that would include the centroid, an intermediate region or ring of snippets further from the centroid and thus being less similar to the centroid than the snippets in the innermost region, and an outermost region or ring of snippets even further from the centroid and even less similar to the centroid of the snippets in the innermost and intermediate regions. It should be appreciated that these regions could be established by different thresholds being reached at step 640. For example, a first threshold may establish the boundary of the innermost region, a second threshold could establish the boundary between the innermost and intermediate regions, and a third threshold (representing the threshold at which the building of the cluster stops) would represent the boundary around the outermost region.

With the clustering stops, each created cluster represents a group of words that have a threshold or minimum similarity to each other (as determined by the distance between the centroid and the most distant words/snippets in the cluster). It should be appreciated that in practice a cluster could be small (just a few snippets/word images), but in many or most cases a cluster might be very large (thousands or more of snippets).

Once the clustering process has been completed at step 644 for each of the clusters created in the word classification/clustering system 140, a cluster ID is assigned to each of you who will cluster at step 650, and the process ends.

Figure 7:
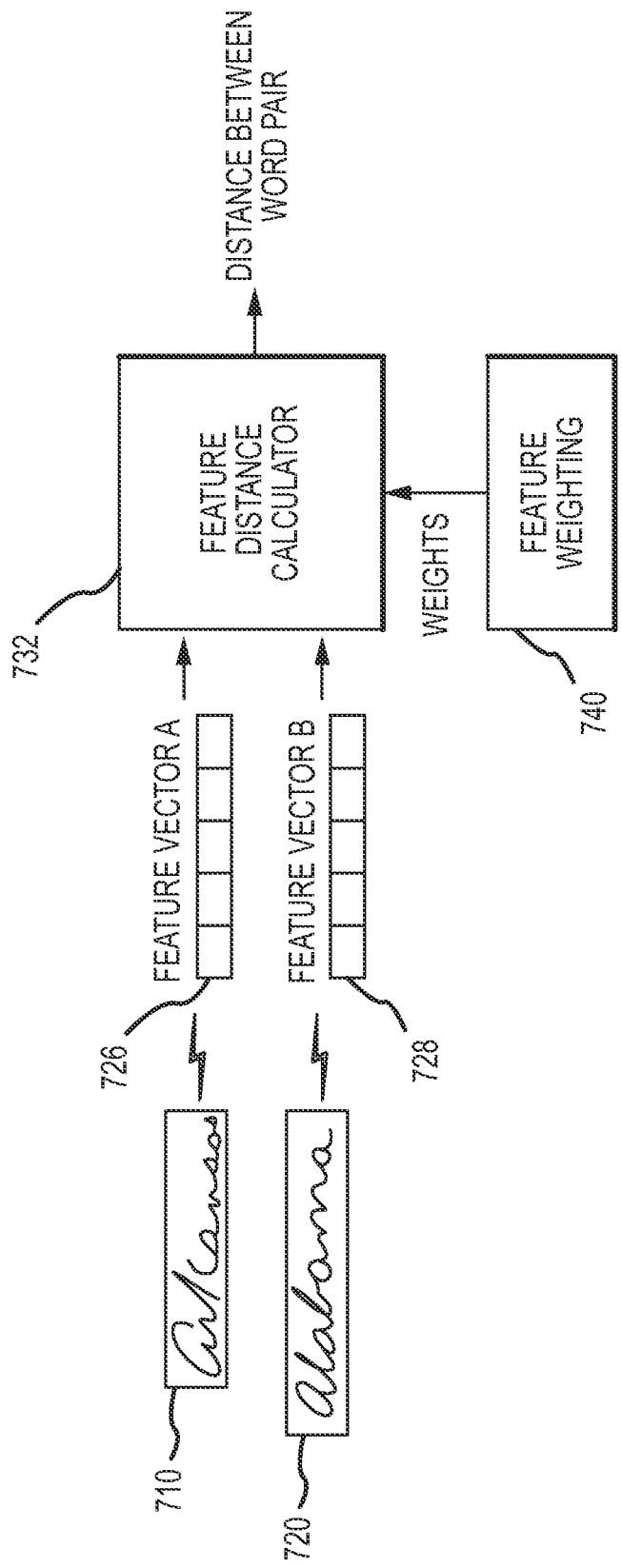
FIG. 7 is a graphical representation of the calculation of distance between two snippets.

FIG. 7 is a graphical illustration of the calculation of distance between a word pair (performed at step 612 in FIG. 6), in particular the distance between a word or snippet 710 ("Arkansas") and a word or snippet 720 ("Alabama"). As discussed earlier, for purposes of calculating a distance, feature vectors 726 and 728 for the two words in question are provided by the word feature extractor system 122 to the word classification/clustering subsystem 140. These feature vectors (labeled "Feature Vector A" and "Feature Vector B" in FIG. 7) are provided to a feature distance calculator 732 within word classification/clustering system 140. The calculator 732 calculates a distance between the corresponding features of the feature vectors 726 and 728, and provides at its output an overall distance between the words as determined by aggregating the individual distances between the corresponding features (feature vector elements) of the two feature vectors. For example, the distance provided at the output of calculator 732 may be the distance between corresponding individual features that are then summed, with the individual features weighted according to feature weights provided by stored feature weighting values 740. The weights may be determined in advance in order to make sure that the individual features (and the numerical values that are generated) are appropriately considered when calculating the overall distance between the two words. Weights may be determined in advanced based on past experiences or judgment of a handwriting expert. As mentioned earlier, in some embodiments the weights might be included in the feature vector, particularly in circumstances where weights may need to be based on the broad category of words involved. For example, weights might be based on the time period of the documents being analyzed and known writing styles during that time period (e.g., during certain historical periods, handwriting customary for certain kinds of legal documents might minimize differences between capital and lowercase letters and so vertical projection profiles, peaks and watershed areas may be less useful in distinguishing words and might be weighted less). As another example, for certain types of records, it may have been customary during certain historical periods to abbreviate words by truncating them in order to conserve space, and so the word aspect ratio for words on those documents might be weighted less. In these examples, the weights involved might be included with all feature vectors for words taken from those documents. Further, weights applied to specific features may be used to scale those features to normalize measurements (e.g., stroke orientation/slant may be measured in degrees typically in excess of 100, whereas word aspect ratio will be typically be a fraction), and weighting compensates for each standard of measurement and its units so that the standard of measurement for individual features itself does not inappropriately skew the results.

In other cases, the weights may be provided independently of the feature vectors, based on feedback received from an handwriting expert involved in the creation of digital text (a person reviewing the results of the clustering and making adjustments to the manner in which words are being clustered in order to correct cluster errors, to a described in more detail later in conjunction with FIGS. 12 and 13).

As mentioned earlier in conjunction with FIG. 5, the nature of a feature vector itself (and differing numbers of dimensional values that may be used to represent each feature) provide some complexity to the feature vector. As such, different types of computations and algorithms may be used to calculate the distance for individual vector features within the feature distance calculator 732 of FIG. 7. This is illustrated in the process of FIG. 8, which illustrates three different calculations of distances between corresponding feature elements of a word pair, based on the dimensional nature of the feature value.

Figure 8:
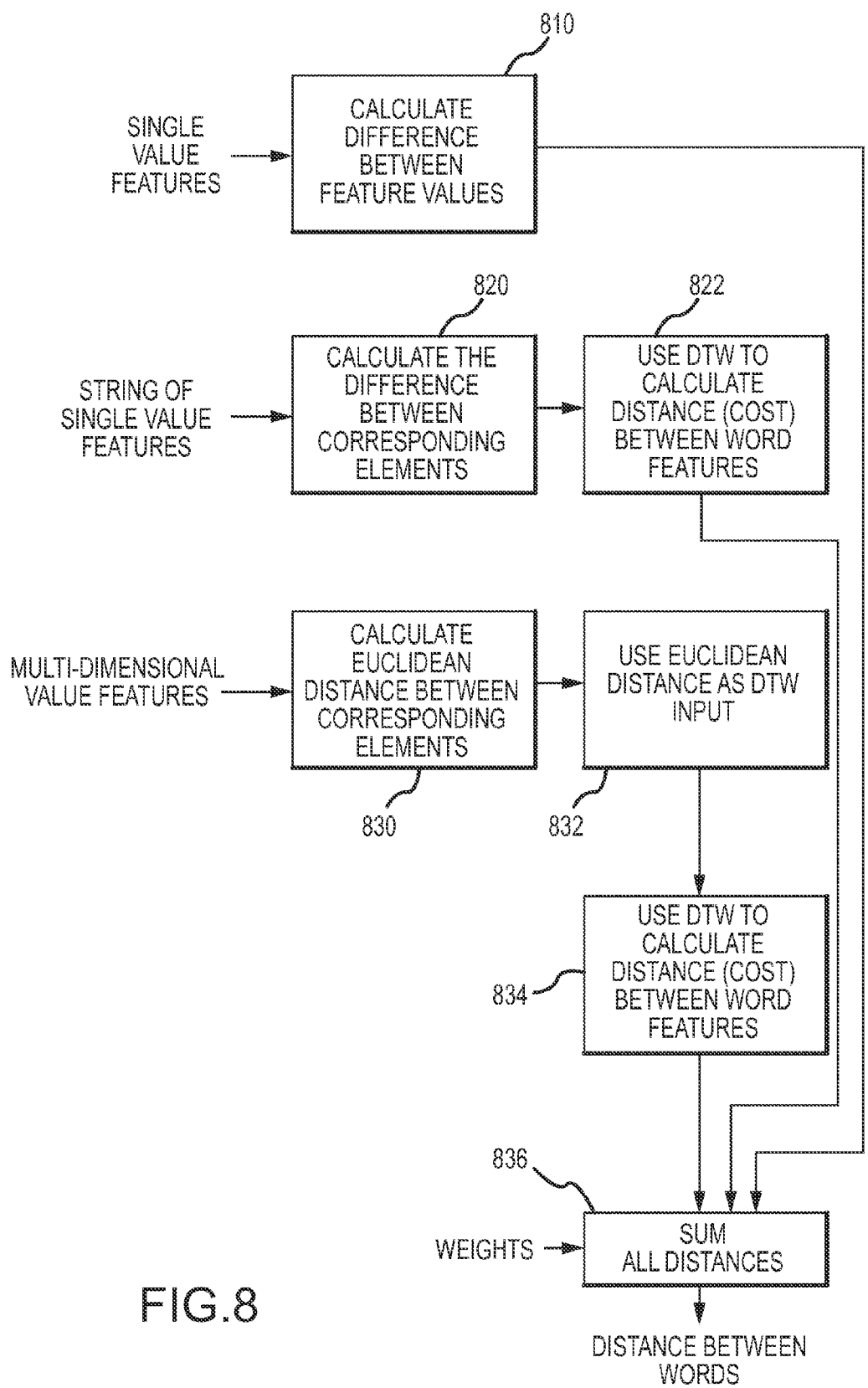
FIG. 8 is a flow diagram illustrating the calculation of distance between different types of word feature elements of two snippets.

The first calculation illustrated in FIG. 8 is for single value features, such as word aspect ratio or stroke orientation/slant (see, e.g., feature element 505 and FIG. 5, representing stroke orientation/slant). The distance between the corresponding features of two words is calculated by simply determining the difference between the feature values at step 810.

The second calculation illustrated in FIG. 8 is for features involving a string of element values, and the computation is more involved. An example of such a feature would be feature element 510 in FIG. 5, representing a top line profile (each value representing the vertical height or top-most pixels of successive horizontal points along the word). The calculation of distance between the two words for this particular feature (this distance sometimes referred to as "cost") is calculated using well-known dynamic time warping (DTW) algorithms at steps 820 and 822. Dynamic time warping compares sequences of values (such as feature values that vary across a data signal—e.g., a word—during a time dimension or the like) by shifting the corresponding pairs of values that are compared over the sequence.

Figure 9:
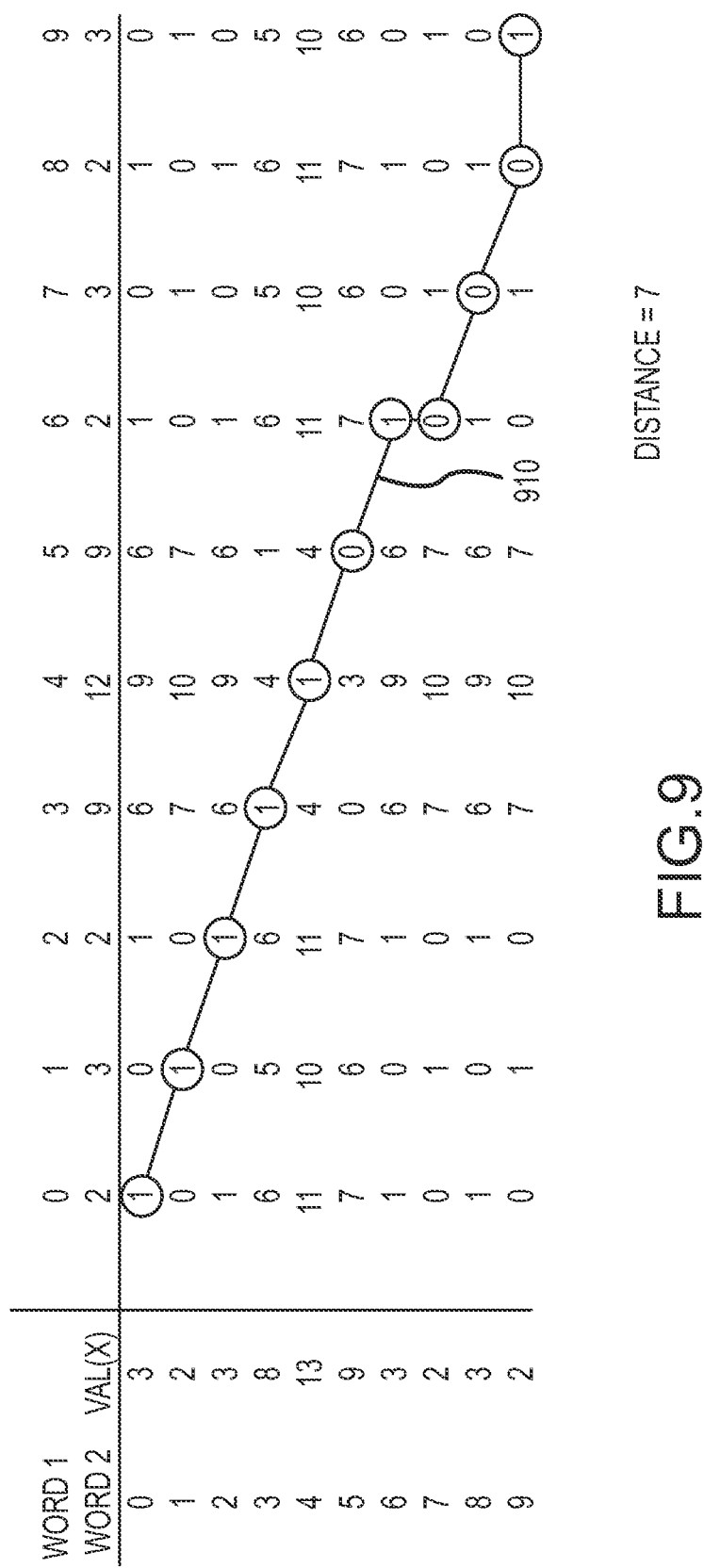
FIG. 9 is a simplified representation of a matrix illustrating the calculation of the distance between corresponding word features of two snippets, using dynamic time warping (DTW).

The DTW technique is well known and is illustrated in simplified form in FIG. 9 as a matrix, where a string of values for a Word 1 (positions 0 through 9, across the top of the matrix) are compared to a string of values for a Word 2 (positions 0 through 9, across the left side of the matrix). In this simple example, the values being compared may be a string of top line profile values (2, 3, 2, 9, 12, 9, 2, 3, 2, 3) for Word 1 and a corresponding string of top line profile values (3, 2, 3, 8, 13, 9, 3, 2, 3, 2) for Word 2, where the matrix values are first populated by determining the difference between each value in Word 1 to every value in Word 2 (step 820 in FIG. 8). Then at step 822, the optimal or shortest distance path across the matrix is determined (path 910) with the values across the path summed to determine the overall distance between the two word features (in the simplified example in FIG. 9, the total distance between the corresponding word features of Words 1 and 2 is 7).

It should be appreciated, that the various values shown in FIG. 9 are greatly simplified and the example is provided simply for the purposes of illustrating the process as it might be used in more complex word features, to be discussed later. Far more detail concerning the nature of DTW calculations can be found in many publications, including, for example, F. Itakura, "Minimum Prediction Residual Principle Applied to Speech Recognition," IEEE Transactions on Acoustic Speech & Signal Processing, vol. ASSP-23, p. 67-72, February, 1975; and H. Sakoe and S. Chiba, "Dynamic Programming Algorithm Optimization for Spoken Word Recognition," IEEE Transactions on Acoustic Speech & Signal Processing, vol. ASSP-26, No. 1, February, 1978), and in various prior patents, such as aforementioned U.S. Pat. No. 6,393,395, entitled "HANDWRITING AND SPEECH RECOGNIZER USING NEURAL NETWORK WITH SEPARATE START AND CONTINUATION OUTPUT SCORES," issued on May 21, 2002 to Guha et al.; U.S. Pat. No. 5,664,058, entitled "METHOD OF TRAINING A SPEAKER-DEPENDENT SPEECH RECOGNIZER WITH AUTOMATED SUPERVISION OF TRAINING SUFFICIENCY," issued on Sep. 2, 1997 to Vysotsky; U.S. Pat. No. 4,918,733, entitled "DYNAMIC TIME WARPING USING A DIGITAL SIGNAL PROCESSOR," issued on Apr. 17, 1990 to Daughtery; and U.S. Pat. No. 488,243, entitled "DYNAMIC TIME WARPING ARRANGEMENT," issued on Dec. 11, 1984 to Brown et al., each of which is hereby incorporated by reference.

The third calculation illustrated in FIG. 8 is for multi-dimensional feature value elements, such as feature elements 515 and 520 in FIG. 5 representing, respectively, peaks having two values (x-y coordinates) and loops-holes having triple values (x-y coordinates and area). In this third calculation, a Euclidean distance calculation is first determined for each element value at step 830.

Thus, for x-y coordinates the Euclidean distance would be calculated as:

$$\text{Distance} = \sqrt{x^2 + y^2}$$

For x-y coordinates and area (a) the Euclidean distance would be calculated as:

$$\text{Distance} = \sqrt{x^2 + y^2 + a^2}$$

At step 832, the Euclidean distance would then be used to populate the DTW algorithm and matrix (such as the matrix seen in FIG. 9, with the Euclidean distance value substituted for the single values shown for Word 1 and Word 2), and at step 834 the distance or cost between those corresponding word features of Word 1 Word 2 would be calculated using the DTW algorithm.

At step 836, the distance between corresponding features of the two words would be summed together (with individual features weighted or normalized, as discussed earlier) to provide the overall distance between the two words.

While described embodiments use dynamic time warping to determine cost or distance between certain types feature values, other forms of analysis could be used for clustering and recognizing words, such as Bayesian networks and neural networks (e.g., convoluted neural networks)

Figure 10:
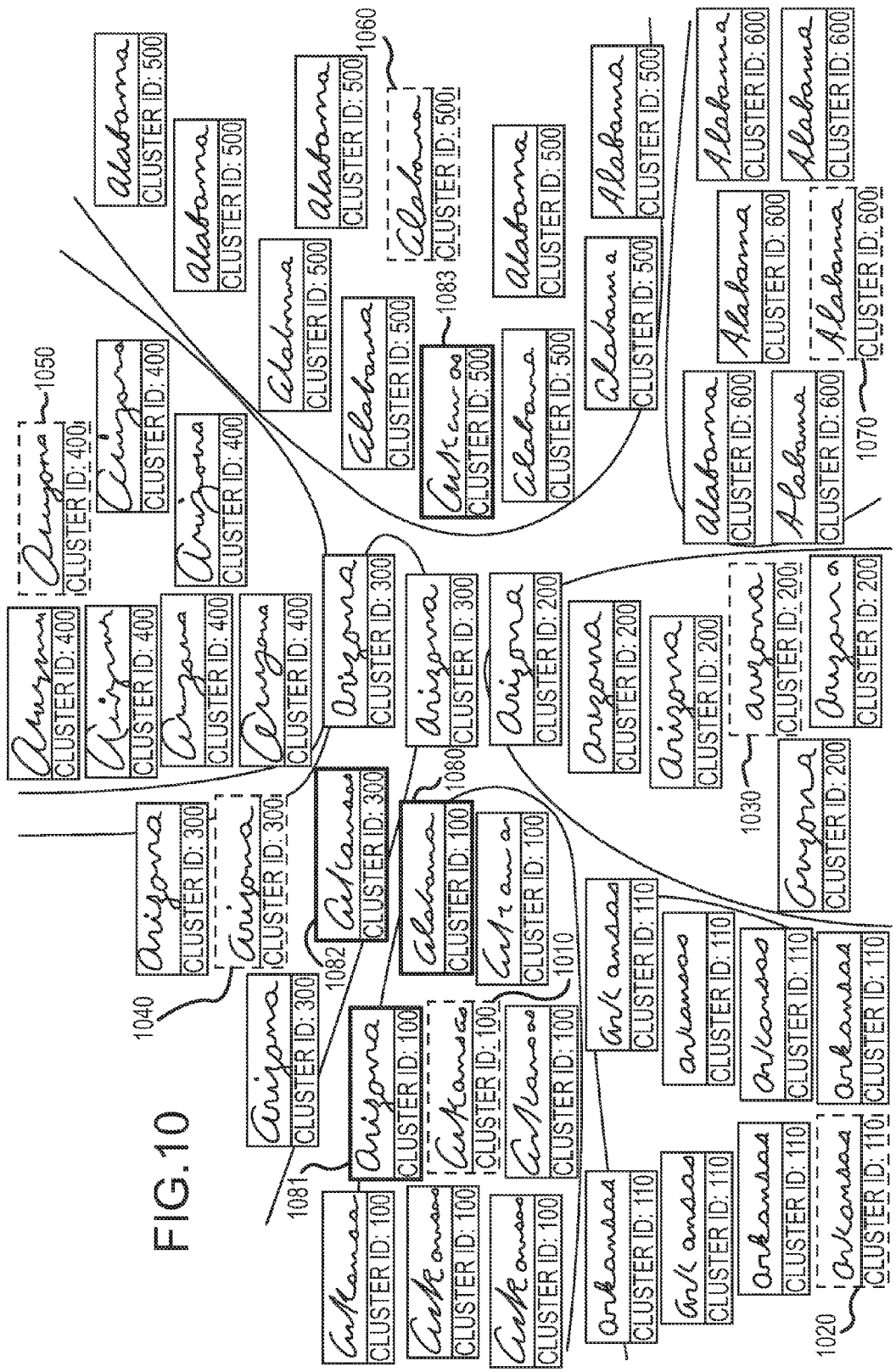
FIG. 10 is a simplified graphical representation of several different word clusters.

Turning now to FIG. 10, a simplified illustration of word clusters for several different word images is seen. It should be appreciated that in actual practice, both the number of clusters and the number of word images or snippets in each cluster is likely to be very large and, hence, much larger than as illustrated in FIG. 10. In FIG. 10, seven word clusters are illustrated, identified as Cluster ID 100 (snippets representing word "Arkansas"), Cluster ID 110 (snippets representing the word "Arkansas," but having word features sufficiently different from those in cluster ID 100, and thus in a separate cluster from Cluster ID 100), Cluster ID 200 (snippets representing the word "Arizona"), Cluster ID 300 (also snippets representing the word "Arizona," but having word features sufficiently different from those in Cluster ID 200), Cluster ID 400 (also snippets representing the word "Arizona," but having word features sufficiently different from those in Cluster IDs 200 and 300), Cluster ID 500 (snippets representing the word "Alabama"), and cluster ID 600 (also snippets representing the word "Alabama," but having word features sufficiently different from those in cluster ID 500).

Also illustrated in FIG. 10 is a snippet 1010 (shown in dotted lines) representing the centroid for Cluster ID 100, snippet 1020 representing the centroid for Cluster ID 110, a snippet 1030 representing the centroid Cluster ID 200, a snippet 1040 representing the centroid for Cluster ID 300, a snippet 1050 representing the centroid for Cluster ID 400, a snippet 1060 representing the centroid for Cluster ID 500 and a snippet 1070 representing the centroid for Cluster ID 600. FIG. 10 also illustrates several errors in the clustering process, including snippets 1080 and 1081 which have been erroneously grouped in Cluster ID 100, a snippet 1082 which has been erroneously clustered in Cluster ID 300, and a snippet 1083 which has been erroneously clustered in Cluster ID 500. The process for identifying and removing erroneous snippets will be described below.

Figure 11:
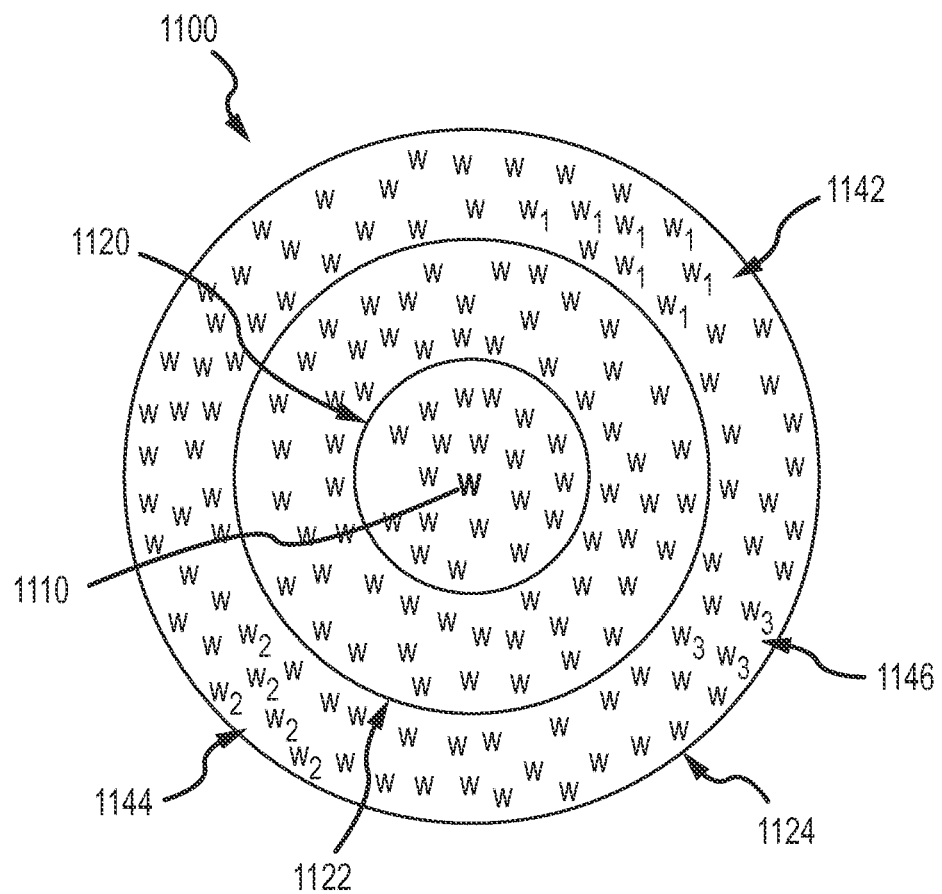
FIG. 11 is a graphical representation of a single word cluster, illustrating the arrangement of words or snippets in several different regions of the word cluster.

FIG. 11 is a graphical representation of a single word cluster 1100. As with other clusters, cluster 1100 represents word images that have been grouped together as likely representing the same single word, which word is represented by the designation "W" in FIG. 11. The cluster 1100 has a centroid 1110 (illustrated graphically in bold and at the center of the cluster 1100). The cluster 1100 is also graphically represented as having three regions defined by circular boundaries. The first region 1120 represents the innermost part/region of the cluster (having words or snippets with word feature vectors closest in distance or similarity to the centroid and thus having the highest likelihood of being correctly included in the cluster). The second region 1122 represents an intermediate part of the cluster (having words or snippets with word feature vectors that are close to the centroid, but not as close as the snippets in region 1120) and thus have a likelihood (but not as high as the snippets in region 1120) of being correctly included in the cluster. The third region 1124 represents the outermost part of the cluster that has words or snippets that are loosely similar to the centroid. Snippets in region 1124 are seen to include words $W_1$ (designated in FIG. 11 by arrow 1142), $W_2$ (designated in FIG. 11 by arrow 1144) and $W_3$ (designated in FIG. 11 by arrow 1146) that have all been erroneously placed in cluster 1100 (they are not the word W) and that can be removed using a process involving human interaction that will be described shortly.

As mentioned earlier, a handwriting analyst or expert is involved in the use of clusters for assigning text words to word images or snippets. In the described embodiment, an analyst performs, in conjunction with various subsystems within the handwriting recognition system 100, at least two functions: (1) keying or entering a digital text word that is recognized when viewing the centroid (the digital text word is then associated with/assigned to all the word images or snippets in the cluster) and (2) examining samples of words in clusters to determine the scope of any errors and whether adjustments need to be made to the algorithms involved in assigning word images to the clusters. Functions performed with the use of a handwriting analyst are illustrated in FIGS. 12 and 13.

The entry of a digital text word for the centroid may be a relatively straightforward process—the analyst has the centroid for a cluster presented, e.g., at a computer screen associated with the handwriting recognition system 100, recognizes (in a vast majority of cases) the centroid word image as a specific handwritten word (e.g., based on the experience/skill of the analyst), and then enters the recognized word (e.g., at a keyboard), with the word cluster labeling and refinement system 150 associating the entered word with every word image in that cluster. However, as mentioned earlier, because of the wide variety of handwriting styles, there will invariably be a few word images in the cluster that have been placed there in error and the handwriting analyst will examine clusters in order to reduce the number of errors and refine the algorithms that are being used to place word images in clusters.

For purposes of the present description, it is assumed that each cluster has been divided into three regions (as illustrated in FIG. 11), and that the process used for examining the cluster for errors in the innermost region (the first region 1120, FIG. 11), where there is a fairly high level of confidence about the grouping of the snippets in that region, may be different than the process used for examining the cluster for errors in the intermediate and outermost regions of the cluster (the second region 1122 and the third region 1124, FIG. 11).

Figure 12:
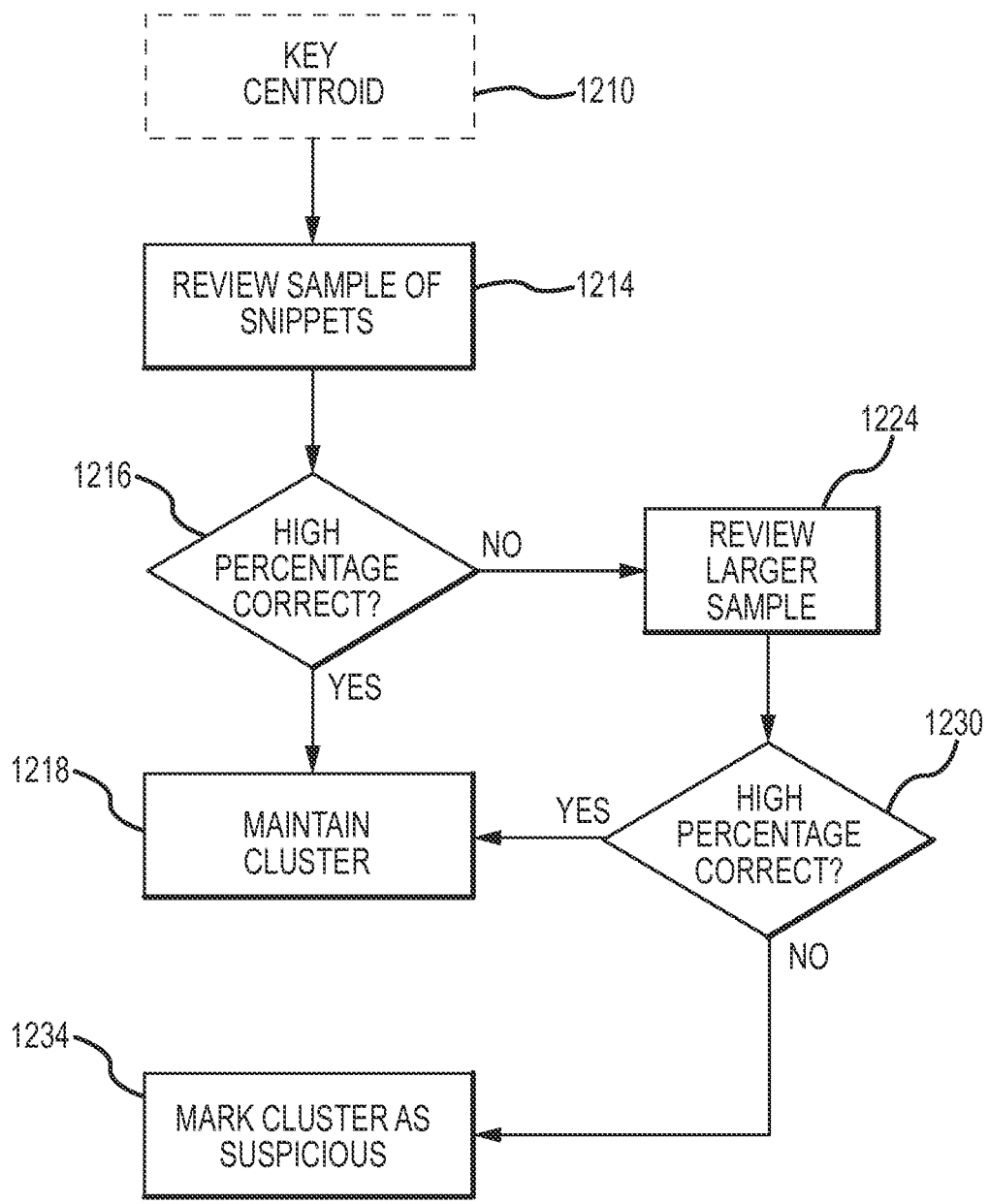
FIG. 12 is a flow diagram illustrating the review, by an analyst, of the innermost region of the word cluster seen in FIG. 11.

FIG. 12 illustrates a process that may be used by an analyst in conjunction with word cluster labeling and refinement system 150 for examining word images in the innermost region (first region 1120). It is assumed before the examination of any regions that the analyst has already keyed in or entered a word for the centroid, as illustrated by step 1210 in FIG. 12. The analyst then reviews a sample of snippets in the first region at step 1214. The review of the snippets may take the form of representative snippets being sequentially displayed to the analyst at a computer screen, with the analysts marking any snippet that is not the same word as represented by the centroid. Because of the high level of confidence in correctness of words in first innermost region, the sample of snippets reviewed at step 1214 may be relatively small, e.g., less than 10% of the snippets in the first region.

At step 1216 the system 100 (in particular, word cluster labeling and refinement subsystem 150) determines whether a high percentage of the sample snippets are correct based on input from the analyst. This percentage will normally be high (e.g., 99%) because, absent a fundamental flaw in the selection of word images for the cluster, there should be very few if any errors. If a high percentage of the sample snippets are correct at step 1216, then the cluster is maintained, step 1218. As part of maintaining the cluster, analysts may review the individual erroneous snippets to see if there are obvious reasons for their presence in the cluster. For example, there may be variations in the spelling of the same word, or two different words may have a single word feature that has similar characteristics as observed by the analyst, and the analysts can determine, for example, if that particular word feature should receive less weight when assembling the word feature vector and calculating distance. In some cases, the analyst may determine the errors are so insignificant that they will not interfere with most research to be done with the documents, and may ignore any errors at steps 1214 and 1216.

If a high percentage of the sample snippets are not correct at step 1216, then the system 100 will normally provide a larger sample of snippets (higher than the 10% initially reviewed at step 1214), at step 1224. If a high percentage of the larger sample is correct, step 1230, then the cluster is maintained (step 1218), with the analyst having the option of reviewing any of the small number found to be incorrect at step 1230 and making appropriate corrections, as mentioned in connection with erroneous snippets determined at step 1214 and 1216. However if a high percentage of the larger sample of snippets are not correct step 1230, then the cluster is marked as suspicious (step 1234) and is not used for purposes of assigning an identified text word to the cluster. Such a condition may be the result of basic flaws in the algorithm used for clustering the snippets, and may require a more thorough review by the analyst to correct the problem.

Figure 13:
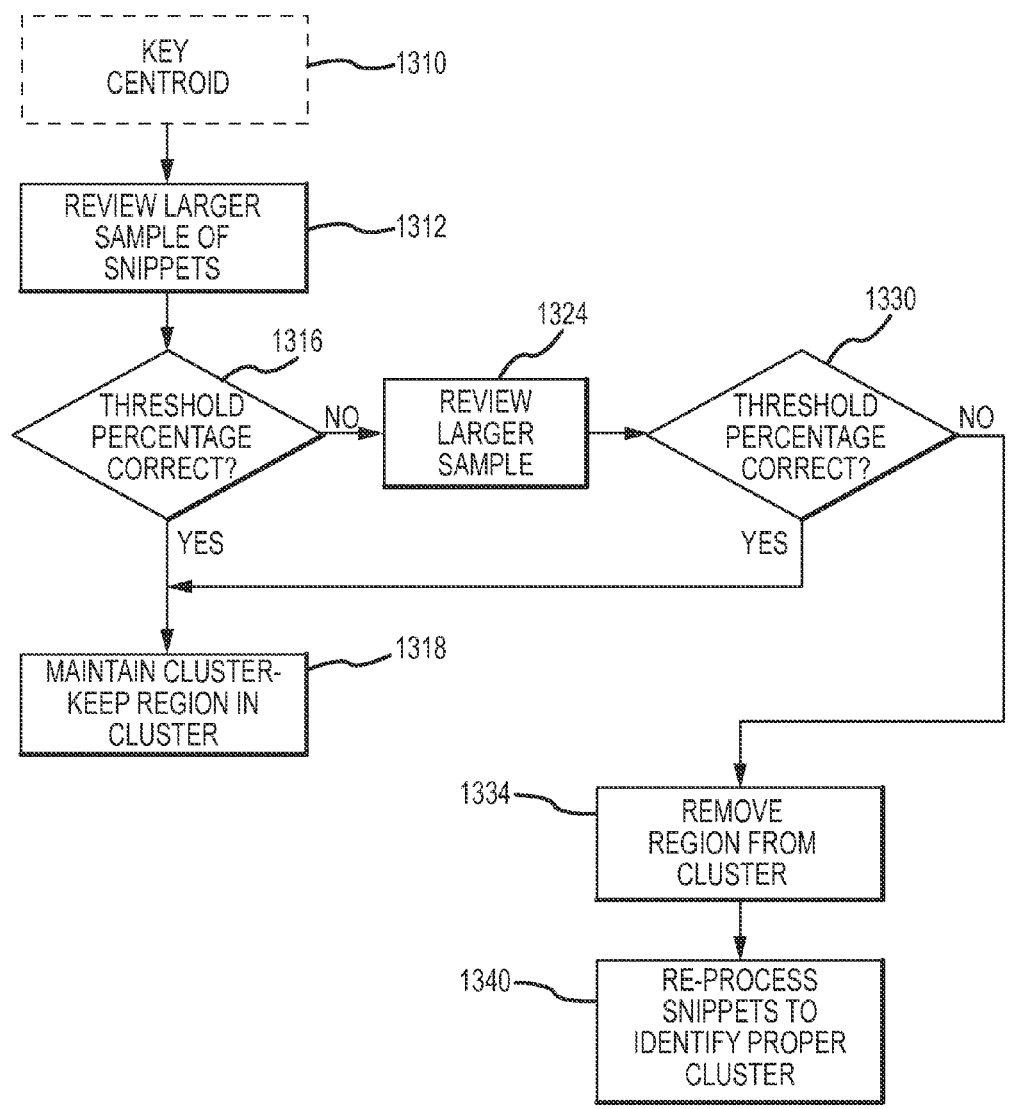
FIG. 13 is a flow diagram illustrating the review, by an analyst, of the intermediate and outermost regions of the word cluster seen in FIG. 11.

FIG. 13 illustrates a process that may be used by an analyst in conjunction with system 100 for examining word images in the intermediate and outermost regions (regions 1122 and 1124) of the word cluster 1100 illustrated in FIG. 11. It is assumed before examination of these regions, as was assumed in connection with the process illustrated in FIG. 12, that the analyst has already keyed in or entered a word for the centroid, as illustrated by step 1310 in FIG. 13. The analyst then reviews a sample of snippets in regions 1122 or 1124, step 1312. The sample of snippets at step 1312 would be expected to be larger than the sample of the innermost region at step 1214, FIG. 12. It should be appreciated that, because the confidence level about the grouping of snippets in the intermediate and outermost regions may be different, the sample of snippets reviewed at step 1312 for those two regions may be different. For example, in one embodiment, there may be a medium level of confidence in the correctness of words in the intermediate region, and the sample of snippets may be, for example, 25% of the snippets in that region. There may be a low level of confidence in the correctness of words in the outermost region 1124, and a sample of snippets may be, for example, in the range of 50 to 80% for that region. At step 1316, the word cluster labeling and refinement system 150 determines whether the established threshold percentage of sample snippets is correct based on input from the analyst. It is expected that the threshold percentage will be relatively high (e.g., 90%) since a high number would be expected in order to keep those regions in the cluster. If the threshold percentage is in fact correct, those regions are maintained as part of the cluster, at step 1318. As part of maintaining the cluster, and as discussed in connection with the process of FIG. 12, the analysts may review the individual or erroneous snippets to see if there are obvious reasons for their presence in the cluster and with the analyst making adjustments, such as weights used in calculating distances and making corrections to erroneous snippets labels, similar to the manner described in conjunction with FIG. 12.

If the threshold percentage is not correct at step 1316, then a larger sample of snippets may be reviewed at step 1324. If the correct snippets are within the threshold percentage, step 1330, then those regions are maintained as part of the cluster at step 1318. If the larger sample of snippets falls outside the threshold percentage at step 1330, then the region may be removed from the cluster at step 1334 and those snippets or words may be returned for further processing, step 1340, to determine if they should be included in a different cluster (such as by repeating the cluster building process for those snippets, as described earlier in conjunction with FIG. 6).

Figure 14:
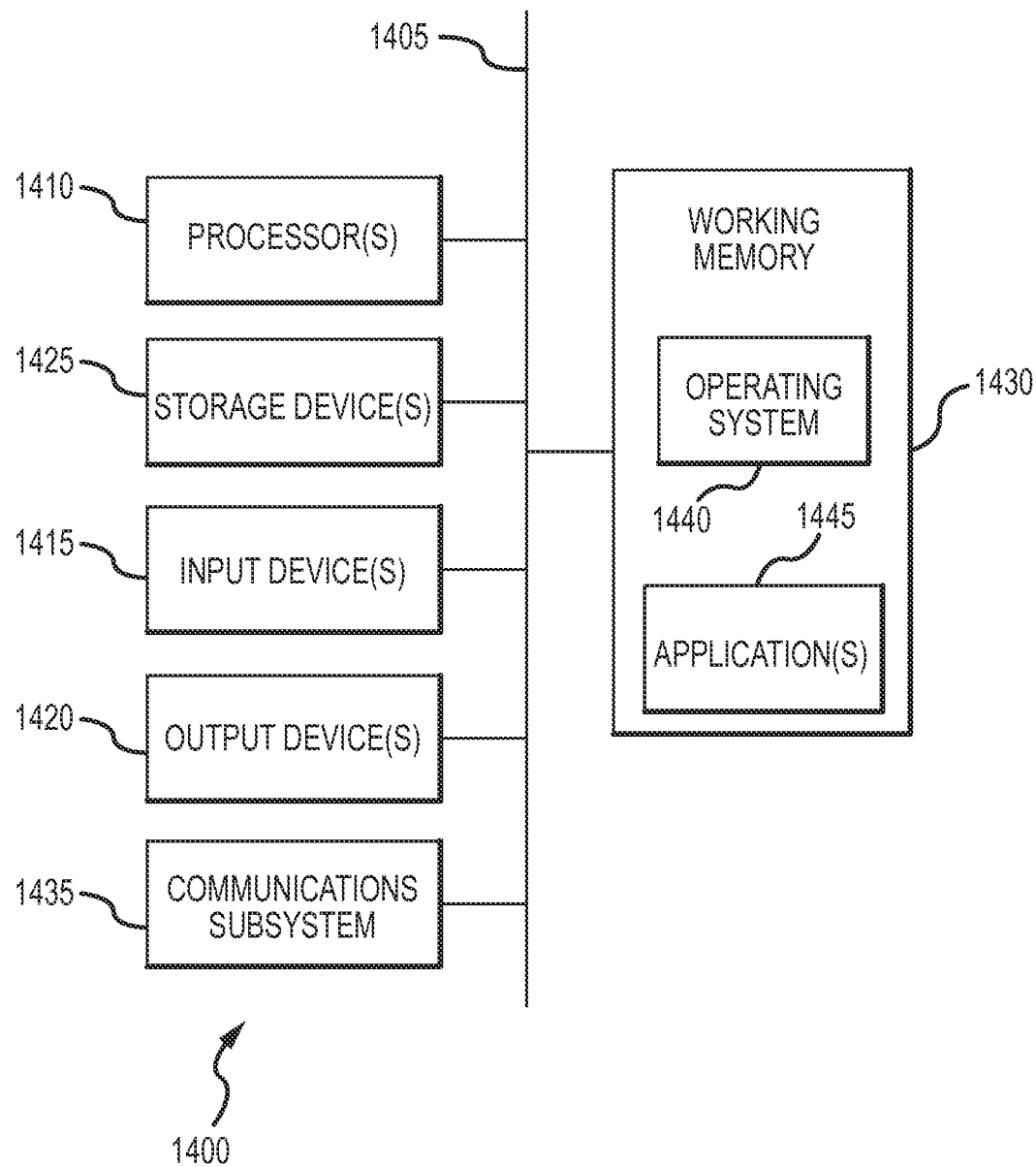
FIG. 14 is a block diagram illustrating an exemplary computer system upon which embodiments of the present invention may be implemented.

FIG. 14 is a block diagram illustrating an exemplary computer system upon which embodiments of the present invention may be implemented. This example illustrates a computer system 1400 such as may be used, in whole, in part, or with various modifications, to provide the functions of the system 100, including the word locator system 110, word feature extractor system 120, word classification/clustering system 140, and word cluster labeling and refinement module/system 150, as well as other components and functions of the invention described herein.

The computer system 1400 is shown comprising hardware elements that can be electrically coupled or otherwise in communication via a bus 1405. The hardware elements can include one or more processors 1410, including, without limitation, one or more general-purpose processors and/or one or more special-purpose processors (such as digital signal processing chips, graphics acceleration chips, and/or the like); one or more input devices 1415, which can include, without limitation, a mouse, a keyboard and/or the like; and one or more output devices 1420, which can include, without limitation, a display device, a printer and/or the like.

The computer system 1400 may further include one or more storage devices 1425, which can comprise, without limitation, local and/or network accessible storage or memory systems having computer or machine readable media. Common forms of physical and/or tangible computer readable media include, as examples, a floppy disk, a flexible disk, hard disk, magnetic tape, or any other magnetic medium, an optical medium (such as CD-ROM), punchcards, papertape, any other physical medium with patterns of holes, a random access memory (RAM), a read only memory (ROM) which can be programmable or flashupdateable or the like, and any other memory chip, cartridge, or medium from which a computer can read data, instructions and/or code. In many embodiments, the computer system 1400 will further comprise a working memory 1430, which could include (but is not limited to) a RAM or ROM device, as described above.

The computer system 1400 also may further include a communications subsystem 1435, such as (without limitation) a modem, a network card (wireless or wired), an infra-red communication device, or a wireless communication device and/or chipset, such as a Bluetooth® device, an 802.11 device, a WiFi device, a WiMax device, a near field communications (NFC) device, cellular communication facilities, etc. The communications subsystem 1435 may permit data to be exchanged with a network, and/or any other devices described herein. Transmission media used by communications subsystem 1435 (and the bus 1405) may include copper wire, coaxial cables and fiber optics. Hence, transmission media can also take the form of waves (including, without limitation radio, acoustic and/or light waves, such as those generated during radio-wave and infra-red data communications).

The computer system 1400 can also comprise software elements, illustrated within the working memory 1430, including an operating system 1440 and/or other code, such as one or more application programs 1445, which may be designed to implement, as an example, the processes seen in FIGS. 2, 6, 8, 12 and 13.

As an example, one or more methods discussed earlier might be implemented as code and/or instructions executable by a computer (and/or a processor within a computer). In some cases, a set of these instructions and/or code might be stored on a computer readable storage medium that is part of the system 1400, such as the storage device(s) 1425. In other embodiments, the storage medium might be separate from a computer system (e.g., a removable medium, such as a compact disc, etc.), and/or provided in an installation package with the instructions/code stored thereon. These instructions might take the form of code which is executable by the computer system 1400 and/or might take the form of source and/or installable code, which is compiled and/or installed on the computer system 1400 (e.g., using any of a variety of generally available compilers, installation programs, compression/decompression utilities, etc.). The communications subsystem 1435 (and/or components thereof) generally will receive the signals (and/or the data, instructions, etc., carried by the signals), and the bus 1405 then might carry those signals to the working memory 1430, from which the processor(s) 1405 retrieves and executes the instructions. The instructions received by the working memory 1430 may optionally be stored on storage device 1425 either before or after execution by the processor(s) 1410.

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the system 100 may be implemented by a single system having one or more storage device and processing elements. As another example, the system 100 may be implemented by plural systems, with their respective functions distributed across different systems either in one location or across a plurality of linked locations.

Moreover, while the various flows and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method for creating digitized text for a record from an image of the record, comprising:
    obtaining one or more digital images of a record;
    evaluating the digital images in order to locate each of multiple word images;
    for each located word image, identifying multiple word features of that word image;
    assigning, to one group of word images, designated ones of the multiple word images based on the distance between the multiple word images, the distance representing the similarity of word features between at least two of the word images;
    selecting a representative word image in the one group of word images, by calculating, at a word clustering system, word feature values for the word features of each of the multiple word images assigned to the one group of word images, and using the word feature values to determine, at the word clustering system, a word image that is representative of the word images in the one group of word images;
    selecting digitized text for the representative word image; and
    assigning the selected digitized text to each of the word images in the one group of word images.

2. The method of claim 1, wherein the record is a historical record having handwritten words, and wherein the multiple word images are each an image of one of the handwritten words.

3. The method of claim 1, wherein the word images each have corresponding word features, and wherein the method further comprises:
    assigning a value to each of the word features; and
    calculating a distance between the at least two of the word images, based on the difference between values of corresponding word features of those two word images.

4. The method of claim 3, wherein the word images each have corresponding word features, and wherein the method further comprises:
    assigning a value to each word feature in a first of the at least two word images and to its corresponding word feature in a second of the at least two word images;
    determining the distance between each word feature in the first of the at least two word images and its corresponding word feature in the second of the at least two word images, based on the values assigned to those word features;
    establishing, in advance, a feature weight for each of the word features; and
    summing together the determined distance for all of the corresponding word features, with each determined distance weighted according to the feature weight established for that word feature.

5. The method of claim 4, wherein the determined distance is calculated based on the dimensional nature of the value, and wherein for word features having a value represented by single value, the determined distance is calculated by determining the difference between: (1) the value of each word feature of the first of the at least two word images and (2) the value of its corresponding word feature in the second of the at least two word images.

6. The method of claim 4, wherein the determined distance is calculated based on the dimensional nature of the value, and wherein for word features having a value represented by sequence of values and for word features having a value represented by multi-dimensional values, the determined distance is calculated using dynamic time warping.

7. The method of claim 1, further comprising:
    calculating a mean of values for word features of the multiple word images assigned to the one group of word images, wherein the step of selecting a representative word image comprises selecting a word image in the one group of word images that is closest to the mean.

8. The method of claim 1, wherein the step of selecting digitized text for the representative word image comprises:
    displaying the representative word image to a handwriting analyst; and
    receiving the selected digitized text from the handwriting analyst based on the displayed representative word.

9. The method of claim 1, wherein the multiple word features are selected from a group comprising: top line profile, bottom-line profile, left line profile, right line profile, vertical projection profile, horizontal projection profile, peaks, valleys, watershed cup areas, watershed cap areas, loops and holes, intersections and crossings, stroke orientation, word aspect ratio, and convex whole.

10. The method of claim 1, further comprising providing a digitized record with searchable computer-readable text based on the selected digitized text assigned to each of the word images.

11. The method of claim 1, further comprising:
    calculating a mean of the word feature values of the multiple word images assigned to the one group of word images, wherein the step of selecting a representative word image comprises selecting, as the representative word, a phantom word image that has values equal to the mean.

12. The system of claim 1, wherein the stored instructions further configure the system to:

calculate a mean of values for word features of the multiple word images assigned to the one group of word images, wherein the step of selecting a representative word image comprises selecting, as the representative word, a phantom word image that has a value equal to the mean.

13. A system for creating digitized text for a record from an image of the record, comprising:
one or more processors; and
a memory, the memory storing instructions that are executable by the one or more processors and configure the system to:
obtain one or more digital images of a record;
evaluate the digital images in order to locate each of multiple word images;
for each located word image, identify multiple word features of that word image;
assign, to one group of word images, designated ones of the multiple word images based on the distance between the multiple word images, the distance representing the similarity of word features between at least two of the word images;
select a representative word image in the one group of word images, by calculating, at the system, word feature values for the word features of each of the multiple word images assigned to the one group of word images, and using the word feature values to determine, at the system, a word image that is representative of the word images in the one group of word images;
select digitized text for the representative word image; and
assign the selected digitized text to each of the word images in the one group of word images.

14. The system of claim 13, wherein the record is a historical record having handwritten words, and wherein the multiple word images are each an image of one of the handwritten words.

15. The system of claim 14, wherein the word images each have corresponding word features, and wherein the stored instructions further configure the system to:
assign a value to each of the word features; and
calculate a distance between the at least two of the word images, based on the difference between values of corresponding word features of those two words.

16. The system of claim 15, wherein the word images each have corresponding word features, and wherein the stored instructions further configure the system to:
assign a value to each word feature in a first of the at least two word images and to its corresponding word feature in a second of the at least two word images;
determine the distance between each word feature in the first of the at least two word images and its corresponding word feature in the second of the at least two word images, based on the values assigned to those word features;
establish, in advance, a feature weight for each of the word features; and
sum together the determined distance for all of the corresponding word features, with each determined distance weighted according to the feature weight established for that word feature.

17. The system of claim 16, wherein the determined distance is calculated based on the dimensional nature of the value, and wherein for word features having a value represented by single value, the determined distance is calculated by determining the difference between: (1) the value of each word feature of the first of the at least two word images and (2) the value of its corresponding word feature in the second of the at least two word images.

18. The system of claim 16, wherein the determined distance is calculated based on the dimensional nature of the value, and wherein for word features having a value represented by sequence of values and for word features having a value represented by multi-dimensional values, the determined distance is calculated using dynamic time warping.

19. The system of claim 13, wherein the stored instructions further configure the system to:
calculate a mean of values for word features of the multiple word images assigned to the one group of word images, wherein the representative word image is selected by selecting a word image in the one group of word images that is closest to the mean.

20. The system of claim 13, wherein the digitized text for the representative word image is selected by:
displaying the representative word image to a handwriting analyst; and
receiving the selected digitized text from the handwriting analyst based on the displayed representative word.

21. The system of claim 13, wherein the multiple word features are selected from a group comprising: top line profile, bottom-line profile, left line profile, right line profile, vertical projection profile, horizontal projection profile, peaks, valleys, watershed cup areas, watershed cap areas, loops and holes, intersections and crossings, stroke orientation, word aspect ratio, and convex whole.

22. The system of claim 13, wherein the stored instructions further configure the system to provide a digitized record with searchable computer-readable text based on the selected digitized text assigned to each of the word images.

* * * * *